United States Patent
Liu et al.

(10) Patent No.: US 11,696,266 B2
(45) Date of Patent: Jul. 4, 2023

(54) METHOD AND COMMUNICATION NODE FOR ALLOCATING AND SCHEDULING CRITERIA FOR WIRELESS RESOURCES USING DCI SIGNALING

(71) Applicants: Zheng Liu, Shanghai (CN); Xiaobo Zhang, Shanghai (CN); Lin Yang, Shanghai (CN)

(72) Inventors: Zheng Liu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 374 days.

(21) Appl. No.: 17/035,990

(22) Filed: Sep. 29, 2020

(65) Prior Publication Data
US 2021/0029695 A1 Jan. 28, 2021

Related U.S. Application Data

(63) Continuation of application No. PCT/CN2019/090098, filed on Jun. 5, 2019.

(30) Foreign Application Priority Data
Jun. 28, 2018 (CN) .......................... 201810685990.5

(51) Int. Cl.
*H04W 72/0446* (2023.01)
*H04W 72/232* (2023.01)
(Continued)

(52) U.S. Cl.
CPC ..... *H04W 72/0446* (2013.01); *H04W 72/232* (2023.01); *H04W 72/50* (2023.01);
(Continued)

(58) Field of Classification Search
CPC .... H04W 72/232; H04W 72/50; H04L 47/70; H04L 47/828; H04B 17/382
See application file for complete search history.

(56) References Cited

U.S. PATENT DOCUMENTS

2015/0085735 A1   3/2015  Shelby et al.
2018/0302191 A1*  10/2018 Park ...................... H04W 28/04
(Continued)

FOREIGN PATENT DOCUMENTS

CN      103053129 A    4/2013
CN      106888506 A    6/2017
(Continued)

OTHER PUBLICATIONS

R1-1701588, "PDCCH procedure and DCI carried by PDSCH region", Feb. 13-17, 2017 (Year: 2017).*
(Continued)

*Primary Examiner* — Salvador E Rivas

(57) ABSTRACT

A method and a device in a communication node for wireless communications are disclosed in the present disclosure. The communication node first receives a first signaling; and then receives a first radio signal in K1 slots and receives a second radio signal in K2 slots; the first signaling is used to determine the K1 and the K2; a first TB is used to generate the first radio signal, while a second TB is used to generate the second radio signal, the first TB comprising a positive integer number of bit(s), and the second TB comprising a positive integer number of bit(s); the K1 slots are divided into X1 slot groups, while the K2 slots are divided into X2 slot groups, and positions of the X1 slot groups and the X2 slot groups are interleaved in time domain. The present disclosure can reduce power consumption and improve coverage performance.

20 Claims, 11 Drawing Sheets

(51) Int. Cl.
*H04W 72/50* (2023.01)
*H04L 47/70* (2022.01)
*H04B 17/382* (2015.01)

(52) U.S. Cl.
CPC ............ *H04B 17/382* (2015.01); *H04L 47/70* (2013.01); *H04L 47/828* (2013.01)

(56) References Cited

U.S. PATENT DOCUMENTS

2020/0052811 A1* 2/2020 Li .................... H04L 5/0055
2020/0267753 A1* 8/2020 Adjakple .......... H04W 72/1268

FOREIGN PATENT DOCUMENTS

CN 107318086 A 11/2017
WO 2018004246 A1 1/2018

OTHER PUBLICATIONS

ISR in application PCT/CN2019/090098 dated Aug. 14, 2019.
Ericsson. "New WID on Rel-16 MTCenhancements for LTE" 3GPP TSG RANMeeting #80 RP-181450,Jun. 15, 2018 (Jun. 15, 2018).
Huawei."CR to 38.212 capturing the RAN1#92bis and RAN1#93meeting agreements" 3GPPTSG RAN WGlMeeting#93R1-1807956,Jun. 7, 2018(Jun. 7, 2018).
3GPP TSG RAN WG1 NR Ad-Hoc#2 R1-1710324 dated Jun. 16, 2017.
First Office Action received from the Chinese patent No. 201810011633.0 dated Sep. 11, 2020.
First Search Report received from the Chinese patent No. 201810011633.0 dated Aug. 20, 2020.
Second Office Action received from the Chinese patent No. 201810011633.0 dated Nov. 12, 2020.

* cited by examiner

| Number of slots comprised in first slot set | Q1 | Number of slots comprised in second slot set | Q2 | Target threshold |
|---|---|---|---|---|
| 2 | 2 | 2 | 2 | 4 |
| 4 | 4 | 4 | 4 | 4 |
| 4 | 8 | 4 | 8 | 4 |
| 4 | 32 | 4 | 32 | 4 |
| 4 | 128 | 4 | 128 | 4 |
| 2 | 2 | 2 | 2 | 8 |
| 4 | 4 | 4 | 4 | 8 |
| 8 | 8 | 8 | 8 | 8 |
| 8 | 32 | 8 | 32 | 8 |
| 8 | 128 | 8 | 128 | 8 |

FIG. 8

METHOD AND COMMUNICATION NODE FOR ALLOCATING AND SCHEDULING CRITERIA FOR WIRELESS RESOURCES USING DCI SIGNALING

CROSS REFERENCE TO RELATED APPLICATIONS

This application is a continuation of International Application No. PCT/CN2019/090098, filed Jun. 5, 2019, claims the priority benefit of Chinese Patent Application No. 201810685990.5, filed on Jun. 28, 2018, the full disclosure of which is incorporated herein by reference.

BACKGROUND

Technical Field

The present disclosure relates to transmission schemes in wireless communication systems, and in particular to a method and device of Narrow Band Internet of Things (NB-IoT) and Machine Type Communication (MTC).

Related Art

In order to meet diverse requirements of IoT applications, Narrow Band Internet of Things (NB-IoT), a new narrowband wireless access system, is introduced into Rel-13 of the 3rd Generation Partner Project (3GPP). Apart from the NB-IoT system, efforts are also made in the 3GPP to standardize properties of the Enhanced Machine Type Communication (eMTC). To put it more specifically, the NB-IoT system and the eMTC system are targeted at different market demands.

Features of the NB-IoT system and the eMTC system of Rel-13 have both been advanced in 3GPP Rel-14. In terms of NB-IoT, a notable advancement is to empower non-anchor physical resource blocks (PRB) with more functionalities, such as supporting transmission on a paging channel, transmission on a random access channel, and additional ones of positioning and multicast. Further advancements in NB-IoT are seen in 3GPP Rel-15, including reducing power consumption, increasing measurement precision and introducing special scheduling requests. At the 3GPP RAN #80 Plenary, a decision has been made on continuing evolution of the NB-IoT system and the eMTC system in Rel-16.

SUMMARY

As decided in Working Item Descriptions (WIDs) of the NB-IoT and the eMTC in Rel-16, support will be given to scheduling transmissions of multiple TBs at one time. Methods such as Semi-Persistent Scheduling (SPS) and scheduling multiple TBs with DCI will potentially be employed and applied to unicast or Single Cell Point To Multipoint (SC-PTM) transmissions. The design of scheduling multiple TBs simultaneously shall take into account factors like the UE's TB buffering capability, coverage performance, decoding capability and power consumption, etc.

A solution is provided in the present disclosure to address the issue of scheduling multiple TBs at the same time. It should be noted that the embodiments of a User Equipment (UE) of the present disclosure and the characteristics in the embodiments may be applied to a base station if no conflict is incurred, and vice versa. In the case of no conflict, the embodiments of the present disclosure and the characteristics in the embodiments may be combined with each other arbitrarily.

The present disclosure provides a method in a first-type communication node for wireless communications, comprising:
  receiving a first signaling;
  receiving a first radio signal in K1 slots; and
  receiving a second radio signal in K2 slots;
  herein, the first signaling is used to determine K1 and K2; a first transport block (TB) is used to generate the first radio signal, while a second TB is used to generate the second radio signal, the first TB comprising a positive integer number of bit(s), and the second TB comprising a positive integer number of bit(s); the K1 slots are divided into X1 slot groups, while the K2 slots are divided into X2 slot groups, and the X1 slot groups and the X2 slot groups are interleaved in time domain; X1 is a positive integer greater than 1, and X2 is a positive integer greater than 1, the K1 is a positive integer no less than the X1, and the K2 is a positive integer no less than the X2, and the first signaling is transmitted via an air interface.

In one embodiment, when the first signaling configures the first radio signal and the second radio signal simultaneously, the fact that positions of the X1 slot groups and the X2 slot groups are interleaved in time domain will support an early termination of receiving of the first radio signal and the second radio signal, thereby enabling a receiving node to enter into Sleep or Deep Sleep as early as possible, through which power consumption and reception delay can be reduced.

According to one aspect of the present disclosure, the above method is characterized in that a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2.

In one embodiment, repetitions of transmission of the first bit block are comprised by slot group(s) of the X1 slot groups, and repetitions of transmission of the second bit block are comprised by slot group(s) of the X2 slot groups, such that symbol-level combined gains can still be guaranteed even if the X1 slot groups and the X2 slot groups are alternately distributed in time domain, which helps improve the link performance.

In one embodiment, one of the X1 slot groups comprises the M1 slot set(s), while one of the X2 slot groups comprises the M2 slot set(s), such that existing slots likely to go through symbol-level combination shall not be separated even when the X1 slot groups and the X2 slot groups are alternately distributed in time domain, thereby contributing to both symbol-level combination and early decoding.

According to one aspect of the present disclosure, the above method is characterized in that a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2; a number of slots comprised by the first slot set is a smaller value between Q1 and a target threshold, and a number of slots comprised by the second slot set is equal to a smaller value between Q2 and the target threshold, the target threshold being a positive integer, the Q1 being a quotient of the K1 and the M1, and the Q2 being a quotient of the K2 and the M2, the Q1 is a positive integer and the Q2 is a positive integer.

According to one aspect of the present disclosure, the above method is characterized in comprising:

receiving a second signaling;

herein, the second signaling is used to determine the X1 and the X2, the second signaling being transmitted via the air interface.

According to one aspect of the present disclosure, the above method is characterized in that an output by the first TB through channel coding is used to generate a first modulation symbol sequence, while an output by the second TB through channel coding is used to generate a second modulation symbol sequence, a first bit sequence is used to determine phases of modulation symbols in the first modulation symbol sequence, while a second bit sequence is used to determine phases of modulation symbols in the second modulation symbol sequence, an identifier of the first TB is used to determine an initial value for a generator of the first bit sequence, while an identifier of the second TB is used to determine an initial value for a generator of the second bit sequence.

The present disclosure provides a method in a first-type communication node for wireless communications, comprising:

transmitting a first signaling;
transmitting a first radio signal in K1 slots; and
transmitting a second radio signal in K2 slots;

herein, the first signaling is used to determine K1 and K2; a first transport block (TB) is used to generate the first radio signal, while a second TB is used to generate the second radio signal, the first TB comprising a positive integer number of bit(s), and the second TB comprising a positive integer number of bit(s); the K1 slots are divided into X1 slot groups, while the K2 slots are divided into X2 slot groups, and the X1 slot groups and the X2 slot groups are interleaved in time domain; X1 is a positive integer greater than 1, and X2 is a positive integer greater than 1, the K1 is a positive integer no less than the X1, and the K2 is a positive integer no less than the X2, and the first signaling is transmitted via an air interface.

According to one aspect of the present disclosure, the above method is characterized in that a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2.

According to one aspect of the present disclosure, the above method is characterized in that a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2; a number of slots comprised by the first slot set is a smaller value between Q1 and a target threshold, and a number of slots comprised by the second slot set is equal to a smaller value between Q2 and the target threshold, the target threshold being a positive integer, the Q1 being a quotient of the K1 and the M1, and the Q2 being a quotient of the K2 and the M2, the Q1 is a positive integer and the Q2 is a positive integer.

According to one aspect of the present disclosure, the above method is characterized in comprising:

transmitting a second signaling;

herein, the second signaling is used to determine the X1 and the X2, the second signaling being transmitted via the air interface.

According to one aspect of the present disclosure, the above method is characterized in that an output by the first TB through channel coding is used to generate a first modulation symbol sequence, while an output by the second TB through channel coding is used to generate a second modulation symbol sequence, a first bit sequence is used to determine phases of modulation symbols in the first modulation symbol sequence, while a second bit sequence is used to determine phases of modulation symbols in the second modulation symbol sequence, an identifier of the first TB is used to determine an initial value for a generator of the first bit sequence, while an identifier of the second TB is used to determine an initial value for a generator of the second bit sequence.

The present disclosure provides a first-type communication node for wireless communications, comprising:

a first receiver, which receives a first signaling;
a second receiver, which receives a first radio signal in K1 slots; and
a third receiver, which receives a second radio signal in K2 slots;

herein, the first signaling is used to determine K1 and K2; a first transport block (TB) is used to generate the first radio signal, while a second TB is used to generate the second radio signal, the first TB comprising a positive integer number of bit(s), and the second TB comprising a positive integer number of bit(s); the K1 slots are divided into X1 slot groups, while the K2 slots are divided into X2 slot groups, and the X1 slot groups and the X2 slot groups are interleaved in time domain; X1 is a positive integer greater than 1, and X2 is a positive integer greater than 1, the K1 is a positive integer no less than the X1, and the K2 is a positive integer no less than the X2, and the first signaling is transmitted via an air interface.

According to one aspect of the present disclosure, the above first-type communication node is characterized in that a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2.

According to one aspect of the present disclosure, the above first-type communication node is characterized in that a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2; a number of slots comprised by the first slot set is a smaller value between Q1 and a target threshold, and a number of slots comprised by the second slot set is equal to a smaller value between Q2 and the target threshold, the target threshold being a positive integer, the Q1 being a quotient of the K1 and the M1, and the Q2 being a quotient of the K2 and the M2, the Q1 is a positive integer and the Q2 is a positive integer.

According to one aspect of the present disclosure, the above first-type communication node is characterized in that the first receiver also receives a second signaling; herein, the second signaling is used to determine the X1 and the X2, the second signaling being transmitted via the air interface.

According to one aspect of the present disclosure, the above first-type communication node is characterized in that an output by the first TB through channel coding is used to generate a first modulation symbol sequence, while an output by the second TB through channel coding is used to generate a second modulation symbol sequence, a first bit sequence is used to determine phases of modulation symbols in the first modulation symbol sequence, while a second bit sequence is used to determine phases of modulation symbols in the second modulation symbol sequence, an identifier of the first TB is used to determine an initial value for a generator of the first bit sequence, while an identifier of the second TB is used to determine an initial value for a generator of the second bit sequence.

The present disclosure provides a second-type communication node for wireless communications, comprising:

a first transmitter, which transmits a first signaling;

a second transmitter, which transmits a first radio signal in K1 slots; and a third transmitter, which transmits a second radio signal in K2 slots;

herein, the first signaling is used to determine K1 and K2; a first transport block (TB) is used to generate the first radio signal, while a second TB is used to generate the second radio signal, the first TB comprising a positive integer number of bit(s), and the second TB comprising a positive integer number of bit(s); the K1 slots are divided into X1 slot groups, while the K2 slots are divided into X2 slot groups, and the X1 slot groups and the X2 slot groups are interleaved in time domain; X1 is a positive integer greater than 1, and X2 is a positive integer greater than 1, the K1 is a positive integer no less than the X1, and the K2 is a positive integer no less than the X2, and the first signaling is transmitted via an air interface.

According to one aspect of the present disclosure, the above second-type communication node is characterized in that a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2.

According to one aspect of the present disclosure, the above second-type communication node is characterized in that a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2; a number of slots comprised by the first slot set is a smaller value between Q1 and a target threshold, and a number of slots comprised by the second slot set is equal to a smaller value between Q2 and the target threshold, the target threshold being a positive integer, the Q1 being a quotient of the K1 and the M1, and the Q2 being a quotient of the K2 and the M2, the Q1 is a positive integer and the Q2 is a positive integer.

According to one aspect of the present disclosure, the above second-type communication node is characterized in that the first transmitter also transmits a second signaling; herein, the second signaling is used to determine the X1 and the X2, the second signaling being transmitted via the air interface.

According to one aspect of the present disclosure, the above second-type communication node is characterized in that an output by the first TB through channel coding is used to generate a first modulation symbol sequence, while an output by the second TB through channel coding is used to generate a second modulation symbol sequence, a first bit sequence is used to determine phases of modulation symbols in the first modulation symbol sequence, while a second bit sequence is used to determine phases of modulation symbols in the second modulation symbol sequence, an identifier of the first TB is used to determine an initial value for a generator of the first bit sequence, while an identifier of the second TB is used to determine an initial value for a generator of the second bit sequence.

In one embodiment, the present disclosure has the following advantages:

By interleaving repetitions of transmission of multiple TBs that are simultaneously scheduled in time domain to support early termination of reception of the multiple TBs, a receiving node well covered will be able to fall into Sleep or Deep Sleep immediately, thus reducing power consumption and reception delay.

When interleaving repetitions of transmission of multiple TBs that are simultaneously scheduled in time domain, a minimum unit of interleave is designed such that (part) of repetitions of transmission of a TB are not interleaved (i.e., repetition blocks in a Cyclic Repetition are not broken), thereby guaranteeing symbol-level combined gains and improving coverage performance.

While ensuring symbol-level combination, an identifier of TB is also added to a symbol-level scrambling sequence to further randomize interference and improve the link performance and coverage performance.

BRIEF DESCRIPTION OF THE DRAWINGS

Other features, objects and advantages of the present disclosure will become more apparent from the detailed description of non-restrictive embodiments taken in conjunction with the following drawings:

FIG. 8 illustrates a schematic diagram of a number of slots comprised by a first slot set and a number of slots comprised by a second slot set according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
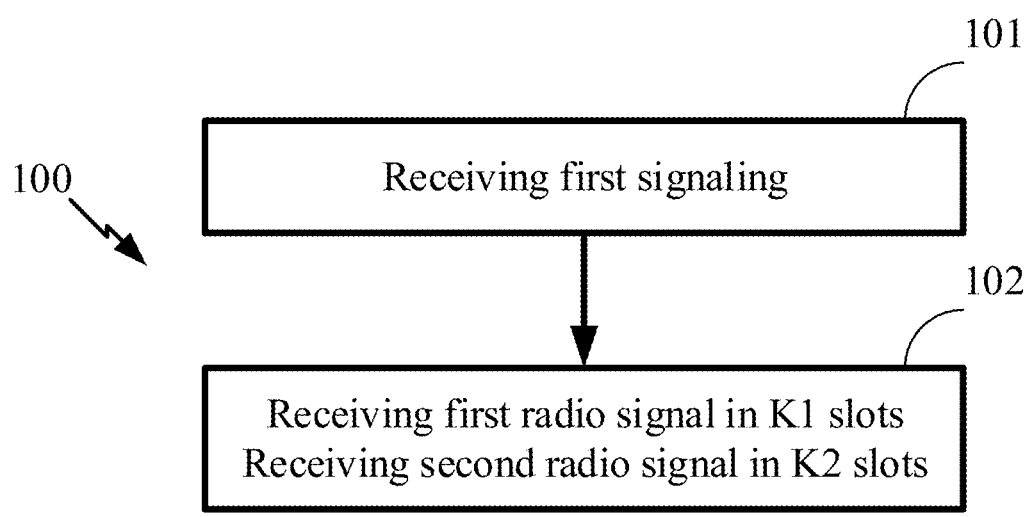
FIG. 1 illustrates a flowchart of transmission of a first signaling, a first radio signal and a second radio signal according to one embodiment of the present disclosure.

Embodiment 1 illustrates a flowchart of transmission of a first signaling, a first radio signal and a second radio signal according to one embodiment of the present disclosure, as shown in FIG. 1. In FIG. 1, each box represents a step.

In Embodiment 1, a first-type communication node in the present disclosure first receives a first signaling; and then receives a first radio signal in K1 slots and a second radio signal in K2 slots; herein, the first signaling is used to determine K1 and K2; a first transport block (TB) is used to generate the first radio signal, while a second TB is used to generate the second radio signal, the first TB comprising a positive integer number of bit(s), and the second TB comprising a positive integer number of bit(s); the K1 slots are divided into X1 slot groups, while the K2 slots are divided into X2 slot groups, and the X1 slot groups and the X2 slot groups are interleaved in time domain; X1 is a positive integer greater than 1, and X2 is a positive integer greater than 1, the K1 is a positive integer no less than the X1, and the K2 is a positive integer no less than the X2, and the first signaling is transmitted via an air interface.

In one embodiment, a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2.

In one embodiment, a number of slots comprised by the first slot set is a smaller value between Q1 and a target threshold, and a number of slots comprised by the second slot set is equal to a smaller value between Q2 and the target threshold, the target threshold being a positive integer, the Q1 being a quotient of the K1 and the M1, and the Q2 being a quotient of the K2 and the M2, the Q1 is a positive integer and the Q2 is a positive integer.

In one embodiment, further comprising:
receiving a second signaling;
herein, the second signaling is used to determine the X1 and the X2, the second signaling being transmitted via the air interface.

In one embodiment, an output by the first TB through channel coding is used to generate a first modulation symbol sequence, while an output by the second TB through channel coding is used to generate a second modulation symbol sequence, a first bit sequence is used to determine phases of modulation symbols in the first modulation symbol sequence, while a second bit sequence is used to determine phases of modulation symbols in the second modulation symbol sequence, an identifier of the first TB is used to determine an initial value for a generator of the first bit sequence, while an identifier of the second TB is used to determine an initial value for a generator of the second bit sequence.

In one embodiment, the first signaling is transmitted via a higher-layer signaling.

In one embodiment, the first signaling is transmitted via a physical-layer signaling.

In one embodiment, the first signaling comprises all or part of a higher-layer signaling.

In one embodiment, the first signaling comprises all or part of a physical-layer signaling.

In one embodiment, the first signaling is transmitted through a Downlink Shared Channel (DL-SCH).

In one embodiment, the first signaling is transmitted through a Physical Downlink Shared Channel (PDSCH).

In one embodiment, the first signaling comprises all or part of Information Elements (IEs) in a Radio Resource Control (RRC) signaling.

In one embodiment, the first signaling comprises all or part of fields of an IE in an RRC signaling.

In one embodiment, the first signaling is transmitted through a Machine type communication Physical Downlink Shared Channel (MPDSCH).

In one embodiment, the first signaling is transmitted through a Narrow-band Physical Downlink Shared Channel (NPDSCH).

In one embodiment, the first signaling comprises one or more fields in a System Information Block (SIB).

In one embodiment, the first signaling comprises one or more fields in Remaining System Information (RMSI).

In one embodiment, the first signaling is broadcast.

In one embodiment, the first signaling is unicast.

In one embodiment, the first signaling is Cell Specific.

In one embodiment, the first signaling is UE-specific.

In one embodiment, the first signaling is transmitted through a Physical Downlink Control Channel (PDCCH).

In one embodiment, the first signaling is transmitted through a Machine type communication Physical Downlink Control Channel (MPDCCH).

In one embodiment, the first signaling is transmitted through a Narrow band Physical Downlink Control Channel (NPDCCH).

In one embodiment, the first signaling comprises all or part of fields in a Downlink Control Information (DCI) signaling.

In one embodiment, the first signaling is transmitted through a PDCCH that schedules the first radio signal and the second radio signal.

In one embodiment, the first signaling comprises all or part of fields in a DCI signaling that schedules the first radio signal and the second radio signal.

In one embodiment, the phrase that the first signaling is used to determine the K1 and the K2 means that the first signaling is used by the first-type communication node to determine the K1 and the K2.

In one embodiment, the phrase that the first signaling is used to determine the K1 and the K2 means that the first signaling directly indicates the K1 and the K2.

In one embodiment, the phrase that the first signaling is used to determine the K1 and the K2 means that the first signaling indirectly indicates the K1 and the K2.

In one embodiment, the phrase that the first signaling is used to determine the K1 and the K2 means that the first signaling explicitly indicates the K1 and the K2.

In one embodiment, the phrase that the first signaling is used to determine the K1 and the K2 means that the first signaling implicitly indicates the K1 and the K2.

In one embodiment, any of the K1 slots is a slot under a given Numerology.

In one embodiment, any of the K1 slots is a subframe in Long Term Evolution (LTE).

In one embodiment, any of the K1 slots is a subframe in New Radio (NR).

In one embodiment, any of the K1 slots is of a time duration of 1 ms.

In one embodiment, any of the K2 slots is a slot under a given Numerology.

In one embodiment, any of the K2 slots is a subframe in Long Term Evolution (LTE).

In one embodiment, any of the K2 slots is a subframe in New Radio (NR).

In one embodiment, any of the K2 slots is of a time duration of 1 ms.

In one embodiment, any two slots among the K1 slots and the K2 slots are different.

In one embodiment, there isn't a time-domain resource belonging to two slots among the K1 slots and the K2 slots simultaneously.

In one embodiment, any two slots of the K1 slots are different.

In one embodiment, any two slots of the K1 slots are orthogonal.

In one embodiment, any two slots of the K2 slots are different.

In one embodiment, any two slots of the K2 slots are orthogonal.

In one embodiment, any of the K1 slots is different from any of the K2 slots.

In one embodiment, any of the K1 slots is orthogonal with any of the K2 slots.

In one embodiment, there isn't a time-domain resource belonging to one of the K1 slots and one of the K2 slots simultaneously.

In one embodiment, the first radio signal is transmitted through a Downlink Shared Channel (DL-SCH).

In one embodiment, the first radio signal is transmitted through a Physical Multicast Channel (PMCH).

In one embodiment, the first radio signal is used to transmit a Multicast Control Channel (MCCH).

In one embodiment, the first radio signal is used to transmit a Multicast Traffic Channel (MTCH).

In one embodiment, the first radio signal is used to transmit a Single Cell Multicast Control Channel (SC-MCCH).

In one embodiment, the first radio signal is used to transmit a Single Cell Multicast Traffic Channel (SC-MTCH).

In one embodiment, the first radio signal is transmitted through a Physical Downlink Shared Channel (PDSCH).

In one embodiment, the first radio signal is transmitted through a Narrow band Physical Downlink Shared Channel (NPDSCH).

In one embodiment, the first radio signal is transmitted through a Machine type communication Physical Downlink Shared Channel (MPDSCH).

In one embodiment, the first radio signal is unicast.

In one embodiment, the first radio signal is multicast.

In one embodiment, the first radio signal is broadcast.

In one embodiment, the first radio signal comprises an initial transmission of the first transport block (TB).

In one embodiment, the first radio signal comprises a retransmission of the first TB.

In one embodiment, the first radio signal comprises repeated transmissions of the first TB.

In one embodiment, the first radio signal is obtained by the first TB sequentially through CRC Insertion, Channel Coding, Rate Matching, Scrambling, Modulation, Layer Mapping, Mapping to Resource Element, repetition, and OFDM Baseband Signal Generation, Modulation and Upconversion.

In one embodiment, the first radio signal is obtained by the first TB sequentially through CRC Insertion, Channel Coding, Rate Matching, Scrambling, Modulation, Layer Mapping, repetition, Mapping to Resource Element, and OFDM Baseband Signal Generation, Modulation and Upconversion.

In one embodiment, the second radio signal is transmitted through a Downlink Shared Channel (DL-SCH).

In one embodiment, the second radio signal is transmitted through a Physical Multicast Channel (PMCH).

In one embodiment, the second radio signal is used to transmit a Multicast Control Channel (MCCH).

In one embodiment, the second radio signal is used to transmit a Multicast Traffic Channel (MTCH).

In one embodiment, the second radio signal is used to transmit a Single Cell Multicast Control Channel (SC-MCCH).

In one embodiment, the second radio signal is used to transmit a Single Cell Multicast Traffic Channel (SC-MTCH).

In one embodiment, the second radio signal is transmitted through a Physical Downlink Shared Channel (PDSCH).

In one embodiment, the second radio signal is transmitted through a Narrow band Physical Downlink Shared Channel (NPDSCH).

In one embodiment, the second radio signal is transmitted through a Machine type communication Physical Downlink Shared Channel (MPDSCH).

In one embodiment, the second radio signal is unicast.

In one embodiment, the second radio signal is multicast.

In one embodiment, the second radio signal is broadcast.

In one embodiment, the second radio signal comprises an initial transmission of the second transport block (TB).

In one embodiment, the second radio signal comprises a retransmission of the second TB.

In one embodiment, the second radio signal comprises repeated transmissions of the second TB.

In one embodiment, the second radio signal is obtained by the second TB sequentially through CRC Insertion, Channel Coding, Rate Matching, Scrambling, Modulation, Layer Mapping, Mapping to Resource Element, repetition, and OFDM Baseband Signal Generation, Modulation and Upconversion.

In one embodiment, the second radio signal is obtained by the second TB sequentially through CRC Insertion, Channel Coding, Rate Matching, Scrambling, Modulation, Layer Mapping, repetition, Mapping to Resource Element, and OFDM Baseband Signal Generation, Modulation and Upconversion.

In one embodiment, the first radio signal and the second radio signal are unicast.

In one embodiment, the first radio signal and the second radio signal are multicast.

In one embodiment, the first radio signal and the second radio signal are broadcast.

In one embodiment, the first TB and the second TB are two different TBs.

In one embodiment, the first TB and the second TB are TBs that are separately generated.

In one embodiment, the first TB and the second TB are two TBs that are separately generated by a MAC layer.

In one embodiment, any two slot groups of the X1 slot groups comprise equal numbers of slots.

In one embodiment, there are two slot groups of the X1 slot groups comprising unequal numbers of slots.

In one embodiment, any of the X1 slot groups comprises slots that are consecutive in time domain.

In one embodiment, there is a slot group of the X1 slot groups comprising slots that are discrete in time domain.

In one embodiment, slots comprised by any of the X1 slot groups comprise consecutive valid slots/subframes in time domain.

In one embodiment, any two slot groups of the X2 slot groups comprise equal numbers of slots.

In one embodiment, there are two slot groups of the X2 slot groups comprising unequal numbers of slots.

In one embodiment, any of the X2 slot groups comprises slots that are consecutive in time domain.

In one embodiment, there is a slot group of the X2 slot groups comprising slots that are discrete in time domain.

In one embodiment, slots comprised by any of the X2 slot groups comprise consecutive valid slots/subframes in time domain.

In one embodiment, the phrase that the X1 slot groups and the X2 slot groups are interleaved in time domain means that there is a slot group of the X2 slot groups in which slots comprised are located between two of the X1 slot groups in time domain.

In one embodiment, the phrase that the X1 slot groups and the X2 slot groups are interleaved in time domain means that there is a slot group of the X1 slot groups in which slots comprised are located between two of the X2 slot groups in time domain.

In one embodiment, the phrase that the X1 slot groups and the X2 slot groups are interleaved in time domain means that the X1 slot groups and the X2 slot groups are alternately distributed in time domain, the X1 being equal to the X2.

In one embodiment, the phrase that the X1 slot groups and the X2 slot groups are interleaved in time domain means that a minimum unit of the interleaving of the X1 slot groups and the X2 slot groups is that one of the X1 slot groups is interleaved with one of the X2 slot groups.

In one embodiment, the phrase that the X1 slot groups and the X2 slot groups are interleaved in time domain means that none of slots comprised in the X1 slot groups is located between two slots comprised in any of the X2 slot groups in time domain.

In one embodiment, the phrase that the X1 slot groups and the X2 slot groups are interleaved in time domain means that none of slots comprised in the X2 slot groups is located between two slots comprised in any of the X1 slot groups in time domain.

In one embodiment, the phrase that the X1 slot groups and the X2 slot groups are interleaved in time domain means that a slot group of the X1 slot groups is distributed in time domain after distribution of a slot group of the X2 slot groups and before a next slot group of the X2 slot groups is distributed.

In one embodiment, the phrase that the X1 slot groups and the X2 slot groups are interleaved in time domain means that a slot comprised in a slot group of the X1 slot groups is distributed in time domain after distribution of a slot comprised in one of the X2 slot groups and before a slot comprised in a next one of the X2 slot groups is distributed.

In one embodiment, the air interface is wireless.

In one embodiment, the air interface comprises a wireless channel.

In one embodiment, the air interface is an interface between a second-type communication node and the first-type communication node.

In one embodiment, the air interface is a Uu interface.

Embodiment 2

Figure 2:
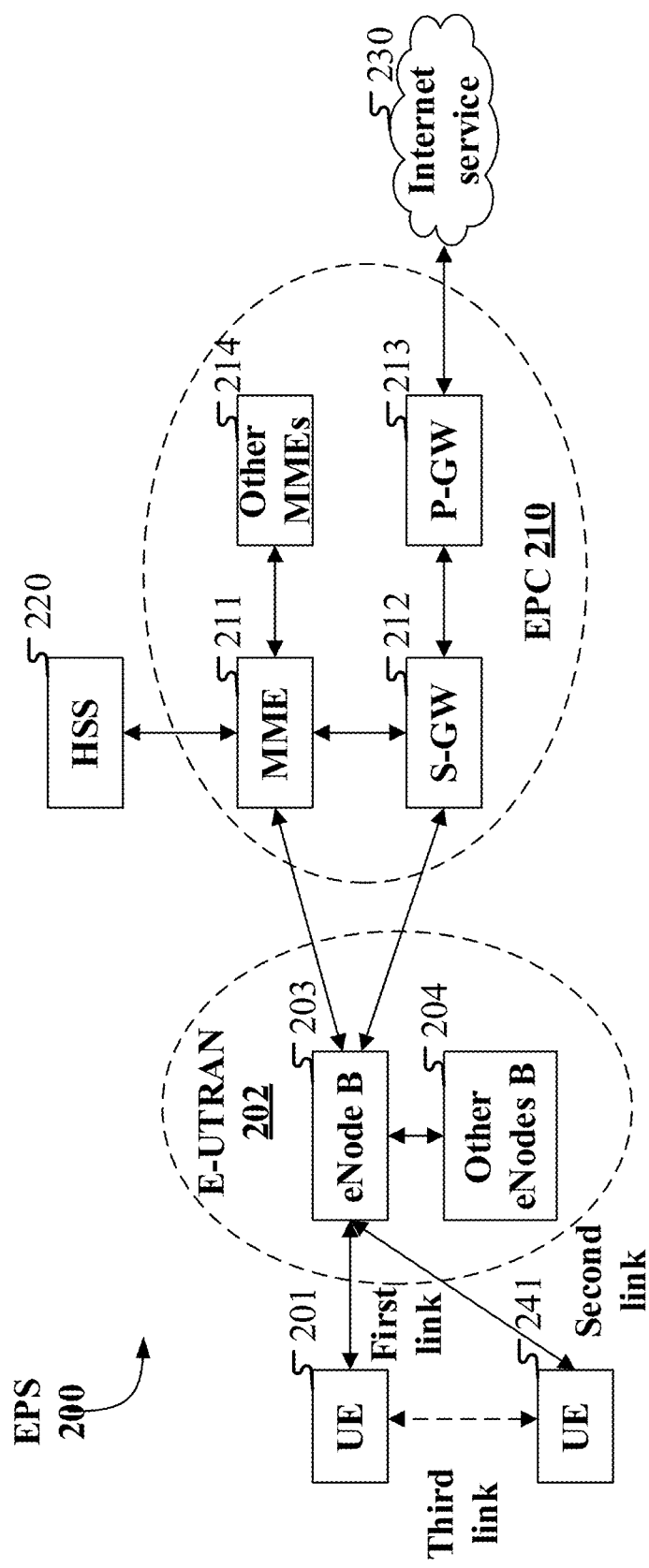
FIG. 2 illustrates a schematic diagram of a network architecture according to one embodiment of the present disclosure.

Embodiment 2 illustrates a schematic diagram of a network architecture, as shown in FIG. 2. FIG. 2 is a diagram illustrating a network architecture 200 of Long-Term Evolution (LTE), and Long-Term Evolution Advanced (LTE-A) and future 5G systems. The network architecture 200 of LTE, LTE-A or future 5G system may be called an Evolved Packet System (EPS) 200. The EPS 200 may comprise one or more UEs 201, a UE 241 in Sidelink communication with the UE 201(*s*), an E-UTRAN 202, an Evolved Packet Core (EPC) 210, a Home Subscriber Server (HSS) 220 and an Internet Service 230. Herein, the UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN 202 comprises an evolved node B (eNB) 203 and other eNBs 204. The eNB 203 provides UE 201-oriented user plane and control plane protocol terminations. The eNB 203 may be connected to other eNBs 204 via an X2 interface (for example, backhaul). The eNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The eNB 203 provides an access point of the EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, communication units in automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The eNB 203 is connected with the EPC 210 via an Si interface. The EPC 210 comprises a Mobility Management Entity (MME) 211, other MMES 214, a Service Gateway (S-GW) 212 and a Packet Date Network Gateway (P-GW) 213. The MME 211 is a control node for processing a signaling between the UE 201 and the EPC 210. Generally, the MME 211 provides bearer and connection management. All user Internet Protocol (IP) packets are transmitted through the S-GW 212; the S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming Services.

In one embodiment, the UE 201 corresponds to the first-type communication node in the present disclosure.

In one embodiment, the UE 201 supports scheduling transmissions of multiple TBs at the same time.

In one embodiment, the UE 201 supports features of NB-IoT.

In one embodiment, the UE 201 supports features of eMTC.

In one embodiment, the gNB203 corresponds to the second-type communication node in the present disclosure.

In one embodiment, the gNB203 supports scheduling transmissions of multiple TBs at the same time.

In one embodiment, the gNB203 supports features of NB-IoT.

In one embodiment, the gNB203 supports features of eMTC.

Embodiment 3

Figure 3:
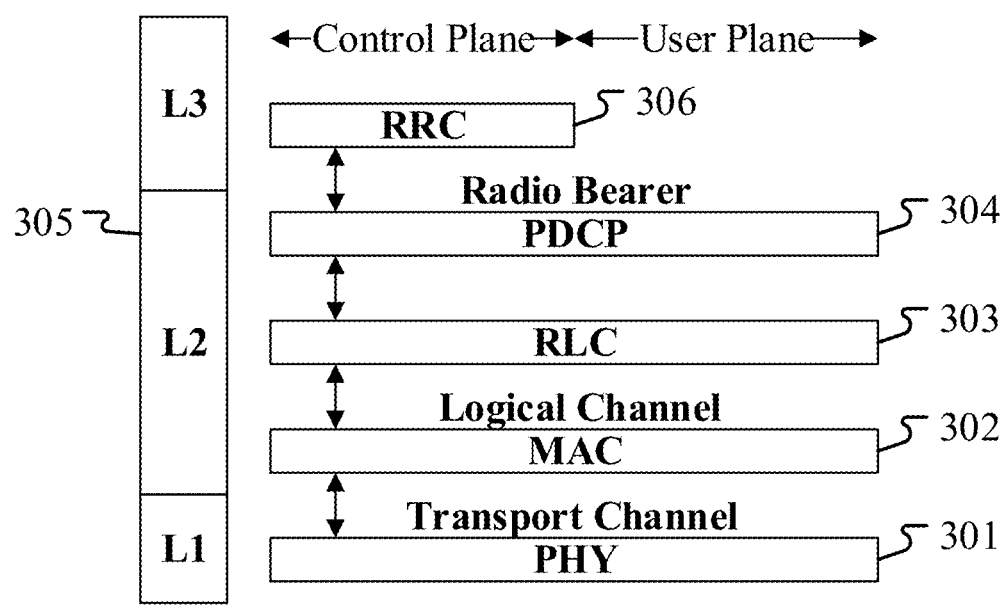
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3. In FIG. 3, the radio protocol architecture for a first-type communication node (UE) and a second-type communication node (gNB, eNB, or, a satellite or an aircraft in NTN) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first-type communication node and the second-type communication node via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second-type communication nodes of the network side. Although not described in FIG. 3, the first-type communication node may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for handover of first-type communication nodes between second-type communication nodes. The RLC sublayer 303 provides segmentation and reassembling of a higher-layer packet, retransmission of a lost packet, and reordering of a packet so as to compensate disordered receiving caused by HARQ. The MAC sublayer 302 provides multiplexing between a logical channel and a transport channel. The MAC sublayer 302 is also responsible for allocating between first-type communication nodes various radio resources (i.e., resource blocks) in a cell. The MAC sublayer 302 is also in charge of HARQ operation. In the control plane, the radio protocol architecture of the first-type communication node and the second-type communication node is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the second-type communication node and the first-type communication node.

In one embodiment, the radio protocol architecture in FIG. 3 is applicable to the first-type communication node in the present disclosure.

In one embodiment, the radio protocol architecture in FIG. 3 is applicable to the second-type communication node in the present disclosure.

In one embodiment, the first radio signal in the present disclosure is generated by the RRC 306.

In one embodiment, the first radio signal in the present disclosure is generated by the MAC 302.

In one embodiment, the first radio signal in the present disclosure is generated by the PHY 301.

In one embodiment, the first signaling in the present disclosure is generated by the RRC 306.

In one embodiment, the first signaling in the present disclosure is generated by the MAC 302.

In one embodiment, the first signaling in the present disclosure is generated by the PHY 301.

In one embodiment, the second radio signal in the present disclosure is generated by the RRC 306.

In one embodiment, the second radio signal in the present disclosure is generated by the MAC 302.

In one embodiment, the second radio signal in the present disclosure is generated by the PHY 301.

In one embodiment, the second signaling in the present disclosure is generated by the RRC 306.

In one embodiment, the second signaling in the present disclosure is generated by the MAC 302.

In one embodiment, the second signaling in the present disclosure is generated by the PHY 301.

Embodiment 4

Figure 4:
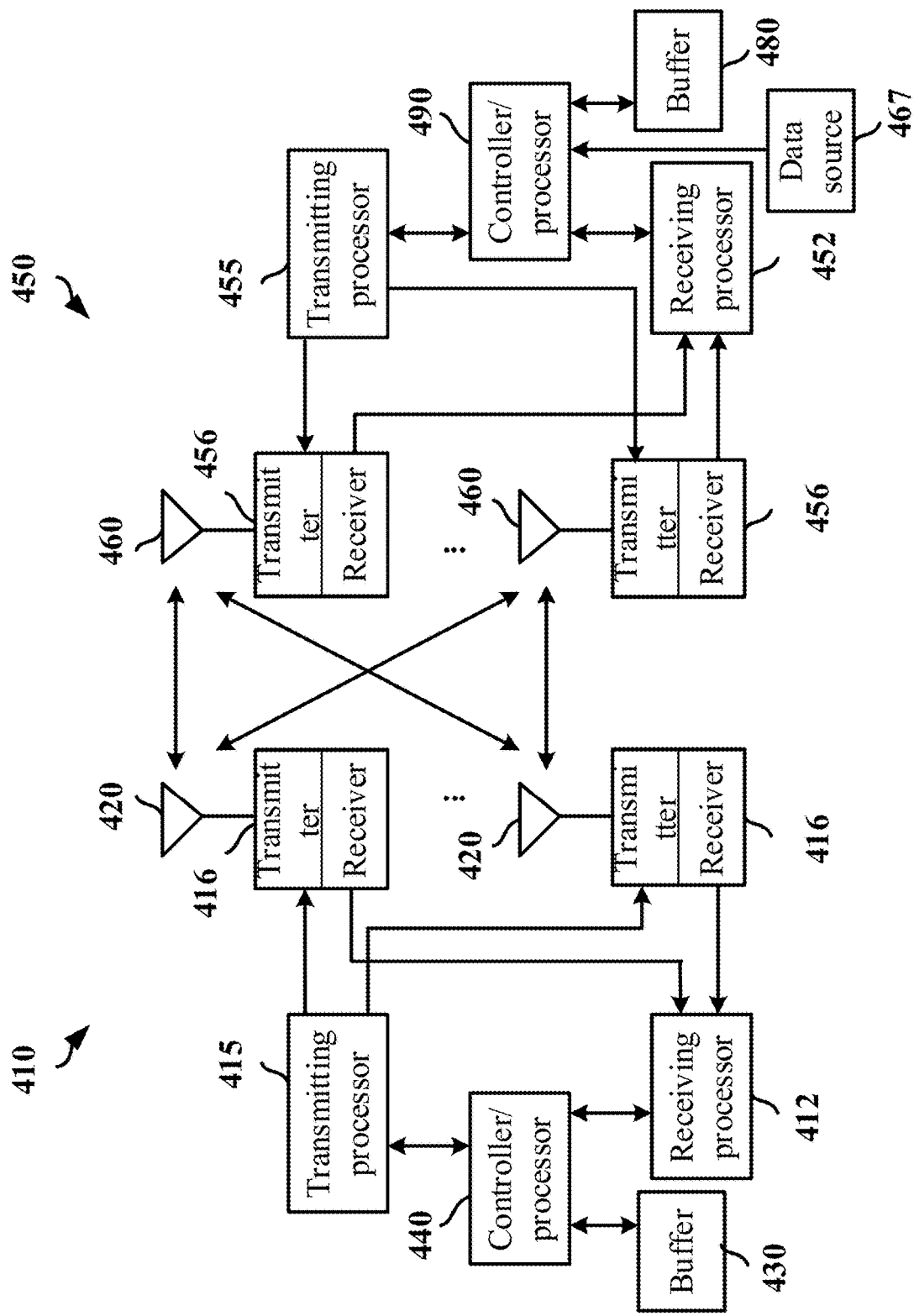
FIG. 4 illustrates a schematic diagram of a base station and a UE according to one embodiment of the present disclosure.

Embodiment 4 illustrates a schematic diagram of a first-type communication node and a second-type communication node according to the present disclosure, as shown in FIG. 4.

The first-type communication node 450 comprises a controller/processor 490, a memory 480, a receiving processor 452, a transmitter/receiver 456 and a transmitting processor 455, and a data source 467, wherein the transmitter/receiver 456 comprises an antenna 460. The data source 467 provides a higher-layer packet to the controller/processor 490, the controller/processor 490 provides header compression and decompression, encryption and decryption, packet segmentation and reordering as well as multiplexing and demultiplexing between a logical channel and a transport channel so as to implement protocols for the L2 layer used for user plane and control plane. The higher-layer packet may comprise data or control information, such as DL-SCH or UL-SCH. The transmitting processor 455 provides various signal transmitting processing functions used for the L1 layer (i.e., PHY), including coding, interleaving, scrambling, modulating, power control/allocation, precoding and physical layer control signaling generation. The receiving processor 452 provides various signaling receiving processing functions used for the L1 layer (i.e., PHY), including decoding, de-interleaving, de-scrambling, demodulating, de-precoding and physical layer control signaling extraction. The transmitter 456 is configured to convert a baseband signal provided by the transmitting processor 455 into a radio frequency (RF) signal to be transmitted via the antenna 460. The receiver 456 converts the RF signal received via the antenna 460 into a baseband signal and provides the baseband signal to the receiving processor 452.

The second-type communication node 410 may comprise a controller/processor 440, a memory 430, a receiving processor 412, a transmitter/receiver 416 and a transmitting processor 415, wherein the transmitter/receiver 416 comprises an antenna 420. A higher-layer packet is provided to the controller/processor 440; the controller/processor 440 provides header compression and decompression, encryption and decryption, packet segmentation and reordering and multiplexing and demultiplexing between a logical channel and a transport channel so as to implement the L2 protocols for a user plane and a control plane. The higher layer packet may comprise data or control information, such as DL-SCH or UL-SCH. The transmitting processor 415 provides various signal transmitting processing functions used for the L1 layer (i.e., PHY), including coding, interleaving, scrambling, modulating, power control/allocation, precoding and physical layer control signaling (including synchronization signal and reference signal) generation. The receiving processor 412 provides various signaling receiving processing functions used for the L1 layer (i.e., PHY), including decoding, de-interleaving, de-scrambling, demodulating, de-precoding and physical layer control signaling extraction. The transmitter 416 is configured to convert a baseband signal provided by the transmitting processor 415 into a radio frequency (RF) signal to be transmitted via the antenna 420. The receiver 416 converts the RF signal received via the antenna 420 into a baseband signal and provides the baseband signal to the receiving processor 412.

In Downlink (DL) transmission, a higher-layer packet, as carried by the first radio signal and the second radio signal in the present disclosure, is provided to the controller/processor 440. The controller/processor 440 implements the functionality of the L2 layer. In DL, the controller/processor 440 provides header compression, encryption, packet segmentation and reordering, multiplexing between a logical channel and a transport channel, as well as radio resources allocation of the first-type communication node 450 based on various priorities. The controller/processor 440 is also in charge of HARQ operation, retransmission of a lost packet and a signaling to the first-type communication node 450, for instance, the first signaling and the second signaling in the present disclosure are generated in the controller/processor 440. The transmitting processor 415 provides various signal-processing functions for the L1 layer (that is, PHY), including coding, interleaving, scrambling, modulating, power control/allocation, precoding and generation of physical-layer control signaling. Generations of a first bit sequence, a second bit sequence, a first modulation symbol sequence and a second modulation symbol sequence in the present disclosure are completed in the transmitting processor 415. Modulation symbols are divided into parallel streams and each stream is mapped onto a corresponding multicarrier subcarrier and/or a multicarrier symbol, which is later mapped from the transmitting processor 415 to the antenna 420 via the transmitter 416 in the form of a radio frequency signal. Corresponding physical-layer channels of a first signaling and second information in the present disclosure are respectively mapped from the transmitting processor 415 to a target radio resource and then mapped from the transmitter 416 to the antenna 420 to be transmitted in the form of radio frequency signals. At the receiving side, each receiver 456 receives the radio frequency signal via a corresponding antenna 460, and recovers baseband information modulated onto a radio frequency carrier and provides the baseband information to the receiving processor 452. The receiving processor 452 provides various signal receiving functions for the L1 layer. The functions include receiving the first radio signal, the second radio signal and physical-layer signals of the first signaling and the second signaling in the present disclosure. Multicarrier symbols in multicarrier symbol streams are demodulated based on varied modulation schemes (i.e., BPSCK, QPSK), and are then de-scrambled, decoded and de-interleaved to recover data or control signal transmitted by the second-type communication node 410 on a physical channel. And after that the data and control signal are provided to the controller/processor 490. The controller/processor 490 is in charge of the L2 layer functionality. The controller/processor 490 interprets the first radio signal, the second radio signal, the first signaling and the second signaling in the present disclosure. The controller/processor 490 may be associated with the memory 480 that stores program codes and data. The memory 480 can be called a computer readable medium.

In one embodiment, the first-type communication node 450 comprises at least one processor and at least one memory. The at least one memory comprises computer program codes; the at least one memory and the computer program codes are configured to be used in collaboration with the at least one processor. The first-type communication node 450 at least receives a first signaling; receives a first radio signal in K1 slots; and receives a second radio signal in K2 slots; herein, the first signaling is used to determine the K1 and the K2; a first transport block (TB) is used to generate the first radio signal, while a second TB is used to generate the second radio signal, the first TB comprising a positive integer number of bit(s), and the second TB comprising a positive integer number of bit(s); the K1 slots are divided into X1 slot groups, while the K2 slots are divided into X2 slot groups, and the X1 slot groups and the X2 slot groups are interleaved in time domain; X1 is a positive integer greater than 1, and X2 is a positive integer greater than 1, the K1 is a positive integer no less than the X1, and the K2 is a positive integer no less than the X2, and the first signaling is transmitted via an air interface.

In one embodiment, the first-type communication node 450 comprises a memory that stores a computer readable instruction program. The computer readable instruction program generates actions when executed by at least one processor, which include: receiving a first signaling; receiving a first radio signal in K1 slots; and receiving a second radio signal in K2 slots; herein, the first signaling is used to determine the K1 and the K2; a first transport block (TB) is used to generate the first radio signal, while a second TB is used to generate the second radio signal, the first TB comprising a positive integer number of bit(s), and the second TB comprising a positive integer number of bit(s); the K1 slots are divided into X1 slot groups, while the K2 slots are divided into X2 slot groups, and the X1 slot groups and the X2 slot groups are interleaved in time domain; X1 is a positive integer greater than 1, and X2 is a positive integer greater than 1, the K1 is a positive integer no less than the X1, and the K2 is a positive integer no less than the X2, and the first signaling is transmitted via an air interface.

In one embodiment, the second-type communication node 410 comprises at least one processor and at least one memory. The at least one memory comprises computer program codes. The at least one memory and the computer program codes are configured to be used in collaboration with the at least one processor. The second-type communication node 410 at least transmits a first signaling; transmits a first radio signal in K1 slots; and transmits a second radio signal in K2 slots; herein, the first signaling is used to determine the K1 and the K2; a first transport block (TB) is used to generate the first radio signal, while a second TB is used to generate the second radio signal, the first TB comprising a positive integer number of bit(s), and the second TB comprising a positive integer number of bit(s); the K1 slots are divided into X1 slot groups, while the K2 slots are divided into X2 slot groups, and the X1 slot groups and the X2 slot groups are interleaved in time domain; X1 is a positive integer greater than 1, and X2 is a positive integer greater than 1, the K1 is a positive integer no less than the X1, and the K2 is a positive integer no less than the X2, and the first signaling is transmitted via an air interface.

In one embodiment, the second-type communication node 410 comprises a memory that stores a computer readable instruction program. The computer readable instruction program generates actions when executed by at least one processor, which include: transmitting a first signaling; transmitting a first radio signal in K1 slots; and transmitting a second radio signal in K2 slots; herein, the first signaling is used to determine the K1 and the K2; a first transport block (TB) is used to generate the first radio signal, while a second TB is used to generate the second radio signal, the first TB comprising a positive integer number of bit(s), and the second TB comprising a positive integer number of bit(s); the K1 slots are divided into X1 slot groups, while the K2 slots are divided into X2 slot groups, and the X1 slot groups and the X2 slot groups are interleaved in time domain; X1 is a positive integer greater than 1, and X2 is a positive integer greater than 1, the K1 is a positive integer no less than the X1, and the K2 is a positive integer no less than the X2, and the first signaling is transmitted via an air interface.

In one embodiment, the receiver 456 (comprising the antenna 460), the receiving processor 452 and the controller/processor 490 are used for reception of the first radio signal in the present disclosure.

In one embodiment, the receiver 456 (comprising the antenna 460), the receiving processor 452 and the controller/processor 490 are used for reception of the second radio signal in the present disclosure.

In one embodiment, the receiver 456 (comprising the antenna 460), the receiving processor 452 and the controller/processor 490 are used for reception of the first signaling in the present disclosure.

In one embodiment, the receiver 456 (comprising the antenna 460), the receiving processor 452 and the controller/processor 490 are used for reception of the second signaling in the present disclosure.

In one embodiment, the transmitter 416 (comprising the antenna 420), the transmitting processor 415 and the controller/processor 440 are used for transmission of the first radio signal in the present disclosure.

In one embodiment, the transmitter 416 (comprising the antenna 420), the transmitting processor 415 and the controller/processor 440 are used for transmission of the second radio signal in the present disclosure.

In one embodiment, the transmitter 416 (comprising the antenna 420), the transmitting processor 415 and the controller/processor 440 are used for transmission of the first signaling in the present disclosure.

In one embodiment, the transmitter 416 (comprising the antenna 420), the transmitting processor 415 and the controller/processor 440 are used for transmission of the second signaling in the present disclosure.

Embodiment 5

Figure 5:
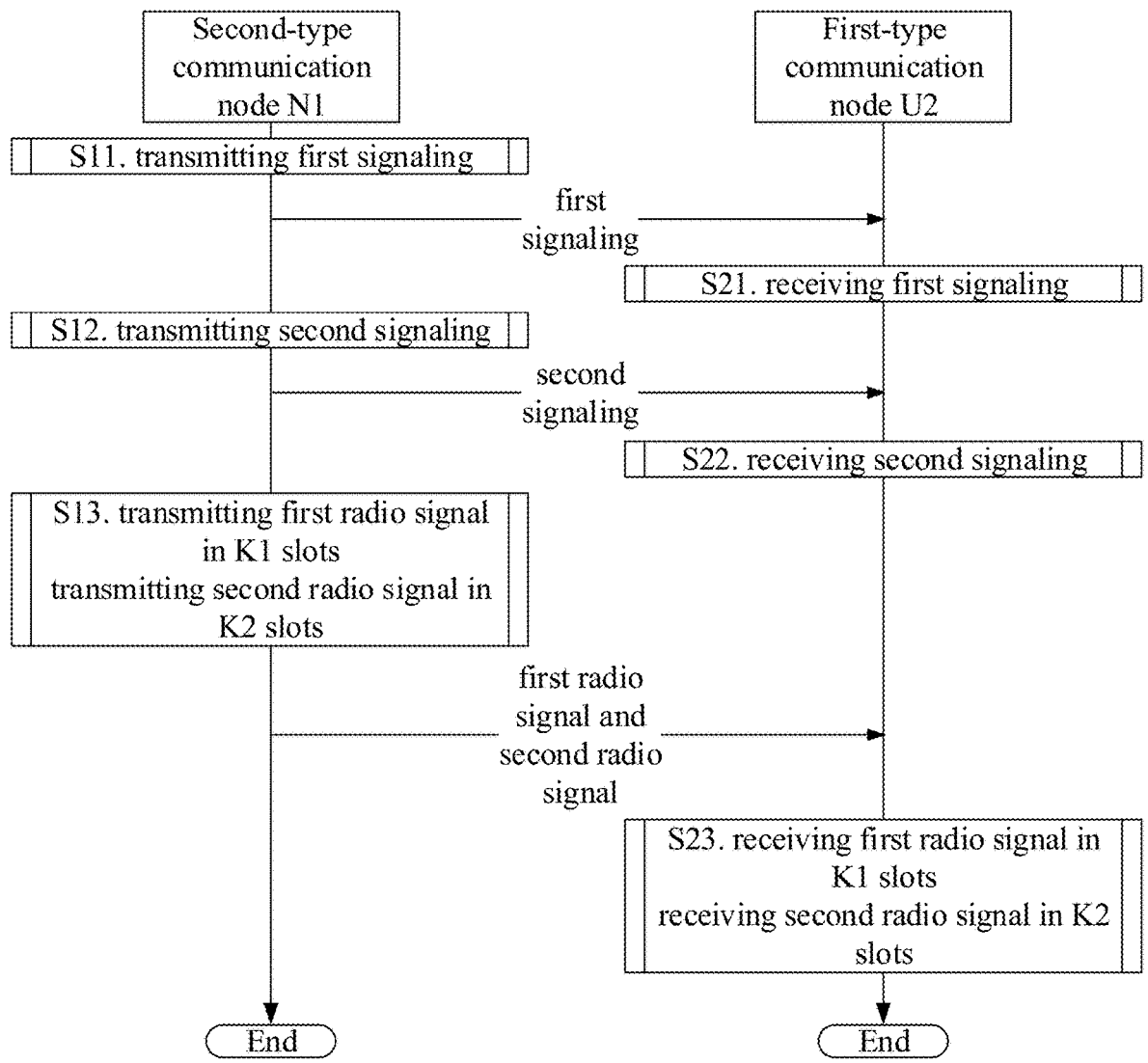
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, a second-type communication node N1 is a maintenance base station for a serving cell of a first-type communication node U2.

The second-type communication node N1 transmits a first signaling in step S11, transmits a second signaling in step S12, and transmits a first radio signal in K1 slots and a second radio signal in K2 slots in step S13.

The first-type communication node U2 receives a first signaling in step S21, receives a second signaling in step S22, and receives a first radio signal in K1 slots and a second radio signal in K2 slots in step S23.

In Embodiment 5, the first signaling is used to determine the K1 and the K2; a first transport block (TB) is used to generate the first radio signal, while a second TB is used to generate the second radio signal, the first TB comprising a positive integer number of bit(s), and the second TB comprising a positive integer number of bit(s); the K1 slots are divided into X1 slot groups, while the K2 slots are divided into X2 slot groups, and the X1 slot groups and the X2 slot groups are interleaved in time domain; X1 is a positive integer greater than 1, and X2 is a positive integer greater than 1, the K1 is a positive integer no less than the X1, and the K2 is a positive integer no less than the X2, and the first signaling is transmitted via an air interface; the second signaling is used to determine the X1 and the X2, the second signaling being transmitted via the air interface.

In one embodiment, a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2.

In one embodiment, a number of slots comprised by the first slot set is a smaller value between Q1 and a target threshold, and a number of slots comprised by the second slot set is equal to a smaller value between Q2 and the target threshold, the target threshold being a positive integer, the Q1 being a quotient of the K1 and the M1, and the Q2 being a quotient of the K2 and the M2, the Q1 is a positive integer and the Q2 is a positive integer.

In one embodiment, an output by the first TB through channel coding is used to generate a first modulation symbol sequence, while an output by the second TB through channel coding is used to generate a second modulation symbol sequence, a first bit sequence is used to determine phases of modulation symbols in the first modulation symbol sequence, while a second bit sequence is used to determine phases of modulation symbols in the second modulation symbol sequence, an identifier of the first TB is used to determine an initial value for a generator of the first bit sequence, while an identifier of the second TB is used to determine an initial value for a generator of the second bit sequence.

In one embodiment, the second signaling comprises a higher-layer signaling.

In one embodiment, the second signaling comprises a physical-layer signaling.

In one embodiment, the second signaling comprises all or part of a higher-layer signaling.

In one embodiment, the second signaling comprises all or part of a physical-layer signaling.

In one embodiment, the second signaling comprises all or part of Information Elements (IEs) in a Radio Resource Control (RRC) signaling.

In one embodiment, the second signaling comprises all or part of fields of an IE in an RRC signaling.

In one embodiment, the second signaling is transmitted through a Downlink Shared Channel (DL-SCH).

In one embodiment, the second signaling is transmitted through a Machine type communication Physical Downlink Shared Channel (MPDSCH).

In one embodiment, the second signaling is transmitted through a Narrow-band Physical Downlink Shared Channel (NPDSCH).

In one embodiment, the second signaling is broadcast.

In one embodiment, the second signaling is unicast.

In one embodiment, the second signaling is Cell Specific.

In one embodiment, the second signaling is UE-specific.

In one embodiment, the second signaling is transmitted through a Physical Downlink Control Channel (PDCCH).

In one embodiment, the second signaling is transmitted through a Machine type Physical Downlink Control Channel (MPDCCH).

In one embodiment, the second signaling is transmitted through a Narrow band Physical Downlink Control Channel (NPDCCH).

In one embodiment, the second signaling comprises all or part of fields in a DCI signaling.

In one embodiment, the phrase that the second signaling is used to determine the X1 and the X2 means that the second signaling is used by the first-type communication node to determine the X1 and the X2.

In one embodiment, the phrase that the second signaling is used to determine the X1 and the X2 means that the second signaling directly indicates the X1 and the X2.

In one embodiment, the phrase that the second signaling is used to determine the X1 and the X2 means that the second signaling indirectly indicates the X1 and the X2.

In one embodiment, the phrase that the second signaling is used to determine the X1 and the X2 means that the second signaling explicitly indicates the X1 and the X2.

In one embodiment, the phrase that the second signaling is used to determine the X1 and the X2 means that the second signaling implicitly indicates the X1 and the X2.

In one embodiment, the first signaling and the second signaling in the present disclosure are two different fields in a same signaling.

In one embodiment, the first signaling and the second signaling in the present disclosure are two independent signalings.

In one embodiment, the first signaling and the second signaling in the present disclosure are encoded through joint coding into a field of a same signaling.

In one embodiment, the first signaling and the second signaling in the present disclosure are respectively transmitted through two independent channels.

Embodiment 6

Figure 6:
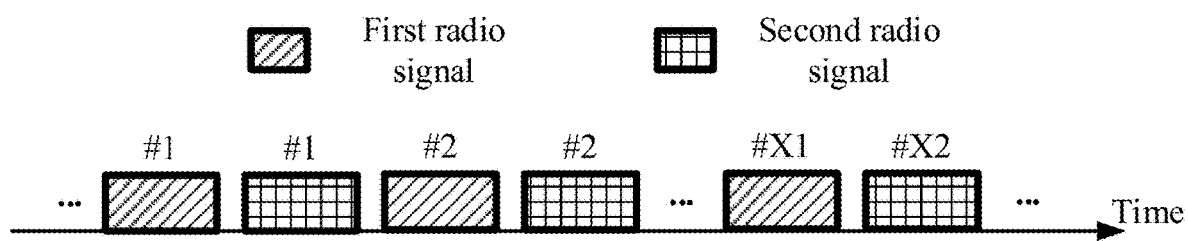
FIG. 6 illustrates a schematic diagram of a relation between a first radio signal and a second radio signal according to one embodiment of the present disclosure.

Embodiment 6 illustrates a schematic diagram of a relation between a first radio signal and a second radio signal according to one embodiment of the present disclosure, as shown in FIG. 6. In FIG. 6, the horizontal axis represents time; each slash-filled box represents a first radio signal in one of X1 slot groups, and each reticle-filled box represents a second radio signal in one of X2 slot groups.

In Embodiment 6, a first transport block (TB) is used to generate the first radio signal in the present disclosure, while a second TB is used to generate the second radio signal in the present disclosure, the first TB comprising a positive integer number of bit(s), and the second TB comprising a positive integer number of bit(s); the K1 slots are divided into X1 slot groups, while the K2 slots are divided into X2 slot groups, and the X1 slot groups and the X2 slot groups are interleaved in time domain; X1 is a positive integer greater than 1, and X2 is a positive integer greater than 1, the K1 is a positive integer no less than the X1, and the K2 is a positive integer no less than the X2.

In one embodiment, the first TB and the second TB are two different TBs.

In one embodiment, the first TB and the second TB are TBs that are separately generated.

In one embodiment, the first TB and the second TB are two TBs that are separately generated by a MAC layer.

In one embodiment, the phrase that the X1 slot groups and the X2 slot groups are interleaved in time domain means that there is a slot group of the X2 slot groups in which slots comprised are located between two of the X1 slot groups in time domain.

In one embodiment, the phrase that the X1 slot groups and the X2 slot groups are interleaved in time domain means that there is a slot group of the X1 slot groups in which slots comprised are located between two of the X2 slot groups in time domain.

In one embodiment, the phrase that the X1 slot groups and the X2 slot groups are interleaved in time domain means that the X1 slot groups and the X2 slot groups are alternately distributed in time domain, the X1 being equal to the X2.

In one embodiment, the phrase that the X1 slot groups and the X2 slot groups are interleaved in time domain means that a minimum unit of the interleaving of the X1 slot groups and the X2 slot groups is that one of the X1 slot groups is interleaved with one of the X2 slot groups.

In one embodiment, the phrase that the X1 slot groups and the X2 slot groups are interleaved in time domain means that none of slots comprised in the X1 slot groups is located between two slots comprised in any of the X2 slot groups in time domain.

In one embodiment, the phrase that the X1 slot groups and the X2 slot groups are interleaved in time domain means that none of slots comprised in the X2 slot groups is located between two slots comprised in any of the X1 slot groups in time domain.

In one embodiment, the phrase that the X1 slot groups and the X2 slot groups are interleaved in time domain means that a slot group of the X1 slot groups is distributed in time domain after distribution of a slot group of the X2 slot groups and before a next slot group of the X2 slot groups is distributed.

In one embodiment, the phrase that the X1 slot groups and the X2 slot groups are interleaved in time domain means that a slot comprised in a slot group of the X1 slot groups is distributed in time domain after distribution of a slot comprised in one of the X2 slot groups and before a slot comprised in a next one of the X2 slot groups is distributed.

Embodiment 7

Figure 7:
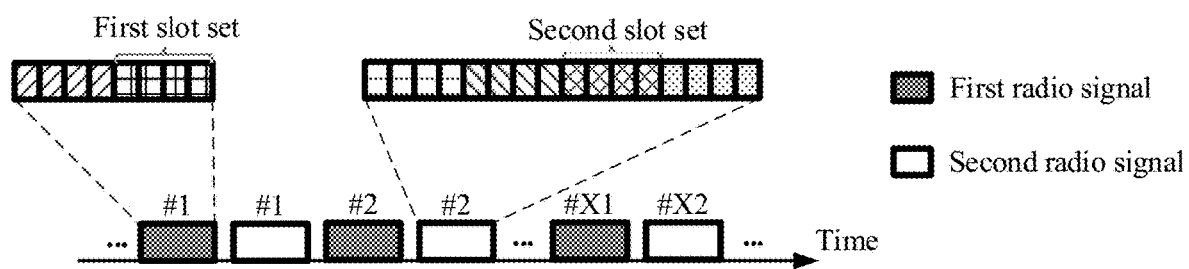
FIG. 7 illustrates a schematic diagram of a first slot set and a second slot set according to one embodiment of the present disclosure.

Embodiment 7 illustrates a schematic diagram of a first slot set and a second slot set according to one embodiment of the present disclosure, as shown in FIG. 7. In FIG. 7, the horizontal axis represents time; each grey box represents a first radio signal in one of X1 slot groups, while each blank box represents a second radio signal in one of X2 slot groups; in the upper part of FIG. 7, each box represents a slot, each reticle-filled box represents a slot in a first slot set, and each cross-filled box represents a slot in a second slot set.

In Embodiment 7, a slot group of the X1 slot groups in the present disclosure comprises M1 slot set(s), while a slot group of the X2 slot groups in the present disclosure comprises M2 slot set(s), a first slot set is one of the M1 slot set(s), and a second slot set is one of the M2 slot set(s); an output by the first TB in the present disclosure through channel coding generates a first bit block, while an output by the second TB in the present disclosure through channel coding generates a second bit block; each slot in the first slot set carries (a) same bit(s) in the first bit block, while each slot in the second slot set carries (a) same bit(s) in the second bit block; the first signaling in the present disclosure is used to determine the M1 and the M2.

In one embodiment, any slot in the first slot set and a slot comprised in a slot group to which the first slot set belongs other than the first slot set respectively carry different bits in the first bit block.

In one embodiment, any slot in the second slot set and a slot comprised in a slot group to which the second slot set belongs other than the second slot set respectively carry different bits in the second bit block.

In one embodiment, the M1 is equal to a number of slots occupied by a repetition of the first TB comprised by the first radio signal.

In one embodiment, the M2 is equal to a number of slots occupied by a repetition of the second TB comprised by the second radio signal.

In one embodiment, the M1 is one among 1, 2, 3, 4, 5, 6, 8 and 10.

In one embodiment, the M2 is one among 1, 2, 3, 4, 5, 6, 8 and 10.

In one embodiment, the M1 is equal to $N_{SF}$ in 3GPP TS36.213 (v15.0.0), section 16.4.1.3.

In one embodiment, the M2 is equal to $N_{SF}$ in 3GPP TS36.213 (v15.0.0), section 16.4.1.3.

In one embodiment, the M1 is a positive integer.

In one embodiment, the M2 is a positive integer.

In one embodiment, any slot set of the M1 slot sets comprises consecutive slots in time-domain.

In one embodiment, any slot set of the M1 slot sets comprises consecutive Valid Slots/Subframes in time-domain.

In one embodiment, any slot set of the M1 slot sets comprises consecutive slots that can be used for the first TB's transmission.

In one embodiment, any slot set of the M2 slot sets comprises consecutive slots in time-domain.

In one embodiment, any slot set of the M2 slot sets comprises consecutive Valid Slots/Subframes in time-domain.

In one embodiment, any slot set of the M2 slot sets comprises consecutive slots that can be used for the second TB's transmission.

In one embodiment, the channel coding is Low Density Parity Check Code (LDPC) coding.

In one embodiment, the channel coding is Turbo coding.

In one embodiment, the channel coding is Polar coding.

In one embodiment, the channel coding is Convolutional coding.

In one embodiment, the channel coding is LDPC coding in 3GPP TS38.212 (v15.2.0), section 5.3.2.

In one embodiment, the channel coding is Polar coding in 3GPP TS38.212 (v15.2.0), section 5.3.1.

In one embodiment, the channel coding is Turbo coding in 3GPP TS36.212 (v15.0.0), section 5.1.3.2.

In one embodiment, the channel coding is Convolutional coding in 3GPP TS36.212 (v15.0.0), section 5.1.3.1.

In one embodiment, each slot in the first slot set carries repeated transmissions of a same bit string in the first bit block.

In one embodiment, each slot in the second slot set carries repeated transmissions of a same bit string in the second bit block.

In one embodiment, the phrase that the first signaling in the present disclosure is used to determine the M1 and the M2 means that the first signaling is used by the first-type communication node to determine the M1 and the M2.

In one embodiment, the phrase that the first signaling in the present disclosure is used to determine the M1 and the M2 means that the first signaling directly indicates the M1 and the M2.

In one embodiment, the phrase that the first signaling in the present disclosure is used to determine the M1 and the M2 means that the first signaling indirectly indicates the M1 and the M2.

In one embodiment, the phrase that the first signaling in the present disclosure is used to determine the M1 and the M2 means that the first signaling explicitly indicates the M1 and the M2.

In one embodiment, the phrase that the first signaling in the present disclosure is used to determine the M1 and the M2 means that the first signaling implicitly indicates the M1 and the M2.

Embodiment 8

Embodiment 8 illustrates a schematic diagram of a number of slots comprised by a first slot set and a number of slots comprised by a second slot set according to one embodiment of the present disclosure, as shown in FIG. 8. In FIG. 8, the first column represents a number of slots comprised in a first slot set, and the second column represents Q1, the third column represents a number of slots comprised in a second slot set, and the fourth column represents Q2, and the fifth column represents a target threshold.

In Embodiment 8, a slot group of the X1 slot groups in the present disclosure comprises M1 slot set(s), while a slot group of the X2 slot groups in the present disclosure comprises M2 slot set(s), a first slot set is one of the M1 slot set(s), and a second slot set is one of the M2 slot set(s); a number of slots comprised by the first slot set is a smaller value between Q1 and a target threshold, and a number of slots comprised by the second slot set is equal to a smaller value between Q2 and the target threshold, the target threshold being a positive integer, the Q1 being a quotient of the K1 and the M1, and the Q2 being a quotient of the K2 and the M2, the Q1 is a positive integer and the Q2 is a positive integer.

In one embodiment, the target threshold is equal to 4.

In one embodiment, if a frequency band to which the first radio signal and the second radio signal belong is a TDD frequency band, the target threshold is related to Uplink-Downlink Configuration of TDD.

In one embodiment, if the first radio signal and the second radio signal employ a frame structure of TDD, the target threshold is related to Uplink-Downlink Configuration of TDD.

In one embodiment, if the first radio signal and the second radio signal employ a Frame Structure Type 2, the target threshold is related to Uplink-Downlink Configuration of the Frame Structure Type 2.

In one embodiment, the target threshold is equal to a number of subframes that can be used for downlink transmission comprised in a Radio Frame in Uplink-Downlink Configuration of a given Frame Structure Type 2.

In one embodiment, the target threshold is equal to a number of subframes that can be used for transmission of the first TB and the second TB comprised in a Radio Frame in Uplink-Downlink Configuration of a given Frame Structure Type 2.

In one embodiment, the target threshold is equal to a total number of Special Subframes and Valid Downlink Subframes comprised in a Radio Frame in Uplink-Downlink Configuration of a given Frame Structure Type 2.

In one embodiment, the Q1 is equal to $M_{rep}^{NPDSCH}$ in 3GPP TS36.211 (v15.0.0), section 10.2.3.1.

In one embodiment, the Q2 is equal to $M_{rep}^{NPDSCH}$ in 3GPP TS36.211 (v15.0.0), section 10.2.3.1.

In one embodiment, the first signaling in the present disclosure is used to determine the K1 and the K2 means that the first signaling indicates the Q1 and the Q2, and the K1 and the K2 are respectively determined according to the Q1 and the Q2.

Embodiment 9

Figure 9:
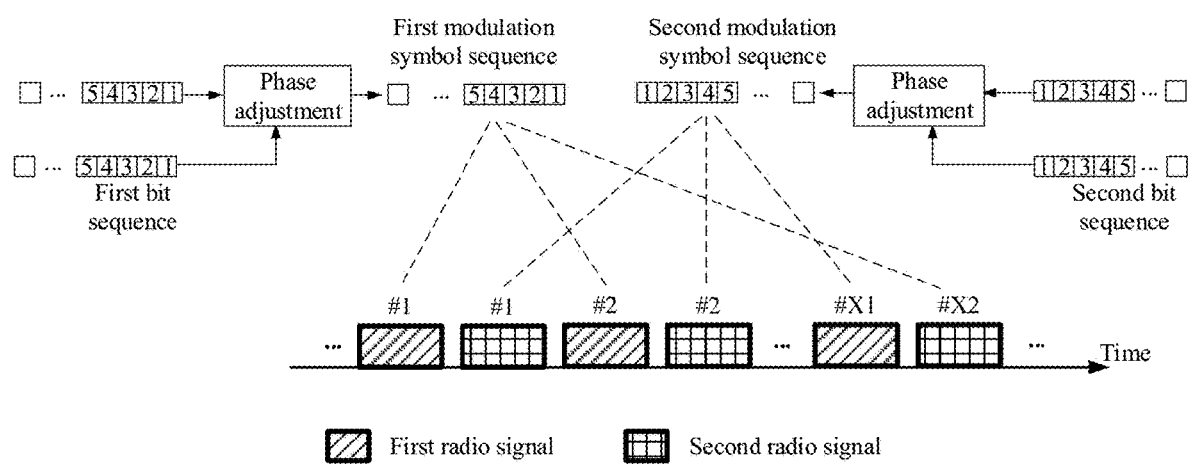
FIG. 9 illustrates a schematic diagram of a first modulation symbol sequence and a second modulation symbol sequence according to one embodiment of the present disclosure.

Embodiment 9 illustrates a schematic diagram of a first modulation symbol sequence and a second modulation symbol sequence according to one embodiment of the present disclosure, as shown in FIG. 9. In FIG. 9, the horizontal axis represents time; each slash-filled box represents a first radio signal in one of X1 slot groups, and each reticle-filled box represents a second radio signal in one of X2 slot groups; a first modulation symbol sequence is used to generate a first radio signal, while a second modulation symbol sequence is used to generate a second radio signal.

In Embodiment 9, an output by the first TB in the present disclosure through channel coding is used to generate a first modulation symbol sequence, while an output by the second TB in the present disclosure through channel coding is used to generate a second modulation symbol sequence, a first bit sequence is used to determine phases of modulation symbols in the first modulation symbol sequence, while a second bit sequence is used to determine phases of modulation symbols in the second modulation symbol sequence, an identifier of the first TB is used to determine an initial value for a generator of the first bit sequence, while an identifier of the second TB is used to determine an initial value for a generator of the second bit sequence.

In one embodiment, the first modulation symbol sequence is generated by the first TB sequentially through CRC Insertion, Channel Coding, Rate Matching, Scrambling, Modulation and Symbol-level Scrambling.

In one embodiment, the first modulation symbol sequence is generated by the first TB sequentially through CRC Insertion, Channel Coding, Rate Matching, Scrambling, Modulation and Phase Rotation.

In one embodiment, the first radio signal is obtained by the first modulation symbol sequence sequentially through Layer Mapping, repetition, Mapping to Resource Element, OFDM Baseband Signal Generation and Modulation and Upconversion.

In one embodiment, the second modulation symbol sequence is generated by the second TB sequentially through CRC Insertion, Channel Coding, Rate Matching, Scrambling, Modulation and Symbol-level Scrambling.

In one embodiment, the second modulation symbol sequence is generated by the second TB sequentially through CRC Insertion, Channel Coding, Rate Matching, Scrambling, Modulation and Phase Rotation.

In one embodiment, the second radio signal is obtained by the second modulation symbol sequence sequentially through Layer Mapping, repetition, Mapping to Resource Element, OFDM Baseband Signal Generation and Modulation and Upconversion.

In one embodiment, the first bit sequence is used to determine phases of modulation symbols comprised in the first modulation symbol sequence through the following formula:

$$\theta_{n_f,n_s}(i) = \begin{cases} 1, & \text{if } c_{n_f,n_s}(2i) = 0 \text{ and } c_{n_f,n_s}(2i+1) = 0 \\ -1, & \text{if } c_{n_f,n_s}(2i) = 0 \text{ and } c_{n_f,n_s}(2i+1) = 1 \\ j, & \text{if } c_{n_f,n_s}(2i) = 1 \text{ and } c_{n_f,n_s}(2i+1) = 0 \\ -j, & \text{if } c_{n_f,n_s}(2i) = 1 \text{ and } c_{n_f,n_s}(2i+1) = 1 \end{cases}$$

Herein, a modulation symbol sequence $y_{n_f,n_s}^{(p)}(0), \ldots, y_{n_f,n_s}^{(p)}(S-1)$ is obtained by the first TB sequentially through CRC Insertion, Channel Coding, Rate Matching, Scrambling and Modulation; the first modulation symbol sequence is obtained by each modulation symbol $y_{n_f,n_s}^{(p)}(i)$ multiplied by $\theta_{n_f,n_s}(i)$; $c_{n_f,n_s}(j)$, $j=0, \ldots 2S-1$ represents the first bit sequence.

In one embodiment, the second bit sequence is used to determine phases of modulation symbols comprised in the second modulation symbol sequence through the following formula:

$$\theta_{n_f,n_s}(i) = \begin{cases} 1, & \text{if } c_{n_f,n_s}(2i) = 0 \text{ and } c_{n_f,n_s}(2i+1) = 0 \\ -1, & \text{if } c_{n_f,n_s}(2i) = 0 \text{ and } c_{n_f,n_s}(2i+1) = 1 \\ j, & \text{if } c_{n_f,n_s}(2i) = 1 \text{ and } c_{n_f,n_s}(2i+1) = 0 \\ -j, & \text{if } c_{n_f,n_s}(2i) = 1 \text{ and } c_{n_f,n_s}(2i+1) = 1 \end{cases}$$

Herein, a modulation symbol sequence $y_{n_f,n_s}^{(p)}(0), \ldots, y_{n_f,n_s}^{(p)}(S-1)$ is obtained by the second TB sequentially through CRC Insertion, Channel Coding, Rate Matching, Scrambling and Modulation; the second modulation symbol sequence is obtained by each modulation symbol $y_{n_f,n_s}^{(p)}(i)$ multiplied by $\theta_{n_f,n_s}(i)$; $c_{n_f,n_s}(j)$, j=0, . . . 2S-1 represents the second bit sequence.

In one embodiment, an identifier of the first TB is an index of the first TB.

In one embodiment, an identifier of the first TB is an ID of the first TB.

In one embodiment, an identifier of the first TB is an ordering number of the first TB when arranged in a chronological order.

In one embodiment, an identifier of the first TB is an index of a Codeword corresponding to the first TB.

In one embodiment, an identifier of the first TB is a sequence number of a Codeword corresponding to the first TB.

In one embodiment, an identifier of the second TB is an index of the second TB.

In one embodiment, an identifier of the second TB is an ID of the second TB.

In one embodiment, an identifier of the second TB is an ordering number of the second TB when arranged in a chronological order.

In one embodiment, an identifier of the second TB is an index of a Codeword corresponding to the second TB.

In one embodiment, an identifier of the second TB is a sequence number of a Codeword corresponding to the second TB.

In one embodiment, an identifier of the first TB is a non-negative integer.

In one embodiment, an identifier of the second TB is a non-negative integer.

In one embodiment, the phrase that an identifier of the first TB is used to determine an initial value for a generator of the first bit sequence means that an identifier of the first TB determines an initial value for a generator of the first bit sequence based on a given mapping relationship.

In one embodiment, the phrase that an identifier of the first TB is used to determine an initial value for a generator of the first bit sequence means that an identifier of the first TB determines an initial value for a generator of the first bit sequence based on a given mapping function.

In one embodiment, the phrase that an identifier of the first TB is used to determine an initial value for a generator of the first bit sequence means that an identifier of the first TB determines an initial value for a generator of the first bit sequence based on a given mapping table.

In one embodiment, the phrase that an identifier of the second TB is used to determine an initial value for a generator of the second bit sequence means that an identifier of the second TB determines an initial value for a generator of the second bit sequence based on a given mapping relationship.

In one embodiment, the phrase that an identifier of the second TB is used to determine an initial value for a generator of the second bit sequence means that an identifier of the second TB determines an initial value for a generator of the second bit sequence based on a given mapping function.

In one embodiment, the phrase that an identifier of the second TB is used to determine an initial value for a generator of the second bit sequence means that an identifier of the second TB determines an initial value for a generator of the second bit sequence based on a given table.

In one embodiment, an identifier of the first TB is used to determine an initial value for a generator of the first bit sequence through the following formula:

$$c_{init} = (n_{RNTI}+1)((10n_f+\lfloor n_s/2 \rfloor) \bmod 61+q+1)2^9 + N_{ID}^{Ncell}$$

Herein, $c_{init}$ represents an initial value for a generator of the first bit sequence; $n_{RNTI}$, $n_s$, and $N_{ID}^{Ncell}$ are defined respectively according to definitions of 3GPP TS36.211 (v15.0.0); q represents an identifier of the first TB.

In one embodiment, an identifier of the second TB is used to determine an initial value for a generator of the second bit sequence through the following formula:

$$c_{init} = (n_{RNTI}+1)((10n_f+\lfloor n_s/2 \rfloor) \bmod 61+q+1)2^9 + N_{ID}^{Ncell}$$

Herein, $c_{init}$ represents an initial value for a generator of the second bit sequence; $n_{RNTI}$, $n_s$, and $N_{ID}^{Ncell}$ are defined respectively according to definitions of 3GPP TS36.211 (v15.0.0); q represents an identifier of the second TB.

In one embodiment, an identifier of the first TB is used to determine an initial value for a generator of the first bit sequence through the following formula:

$$c_{init} = (n_{RNTI}+q+1) \bmod 2^{16}((10n_f+\lfloor n_s/2 \rfloor) \bmod 61+q+1)2^9 + N_{ID}^{Ncell}$$

Herein, $c_{init}$ represents an initial value for a generator of the first bit sequence; $n_{RNTI}$, $n_s$, and $N_{ID}^{Ncell}$ are defined respectively according to definitions of 3GPP TS36.211 (v15.0.0); q represents an identifier of the first TB.

In one embodiment, an identifier of the second TB is used to determine an initial value for a generator of the second bit sequence through the following formula:

$$c_{init} = (n_{RNTI}+q+1) \bmod 2^{16}((10n_f+\lfloor n_s/2 \rfloor) \bmod 61+q+1)2^9 + N_{ID}^{Ncell}$$

Herein, $c_{init}$ represents an initial value for a generator of the second bit sequence; $n_{RNTI}$, $n_s$, and $N_{ID}^{Ncell}$ are defined respectively according to definitions of 3GPP TS36.211 (v15.0.0); q represents an identifier of the second TB.

Embodiment 10

Figure 10:
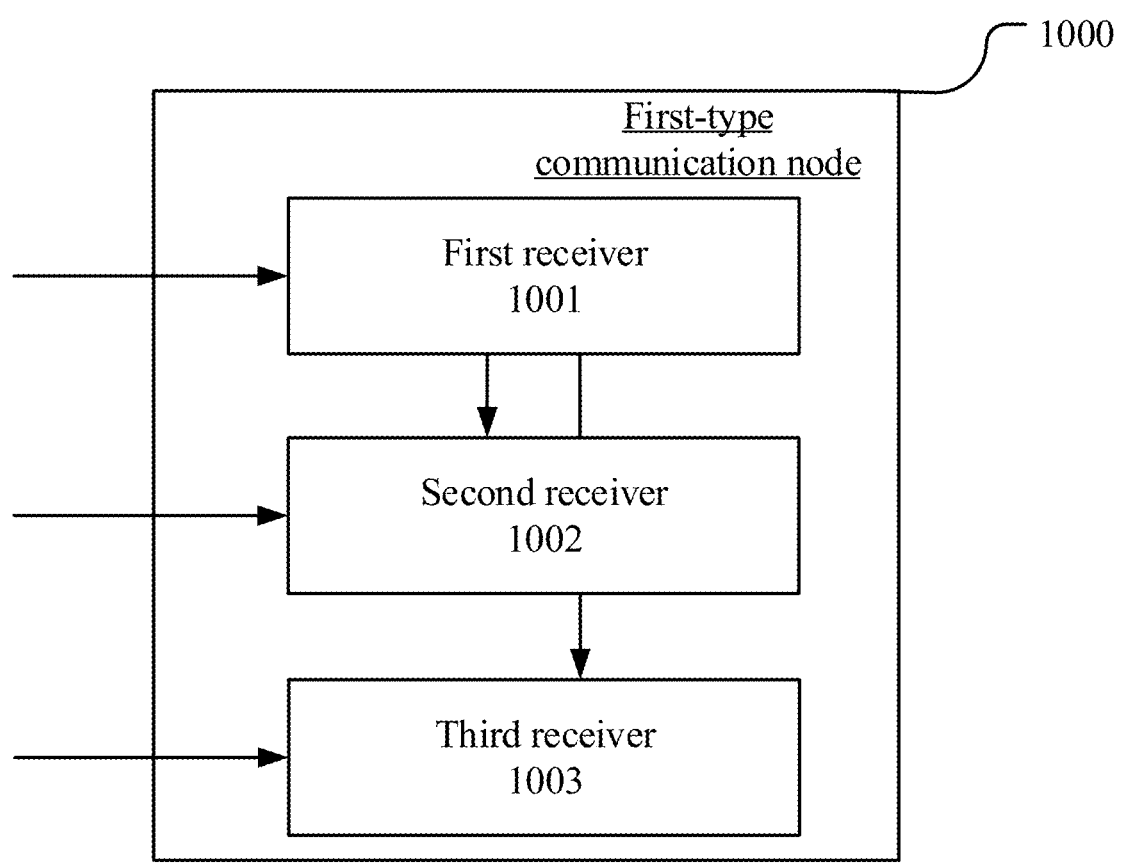
FIG. 10 illustrates a structure block diagram of a processing device in a first-type communication node according to one embodiment of the present disclosure.

Embodiment 10 illustrates a structure block diagram of a processing device in a first-type communication node, as shown in FIG. 10. In FIG. 10, a first-type communication node's processing device 1000 is mainly composed of a first receiver 1001, a second receiver 1002 and a third receiver 1003. The first receiver 1001 comprises the transmitter/receiver 456 (comprising the antenna 460), the receiving processor 452 and the controller/processor 490 in FIG. 4 of the present disclosure; the second receiver 1002 comprises the transmitter/receiver 456 (comprising the antenna 460), the receiving processor 452 and the controller/processor 490 in FIG. 4 of the present disclosure; the third receiver 1003 comprises the transmitter/receiver 456 (comprising the antenna 460), the receiving processor 452 and the controller/processor 490 in FIG. 4 of the present disclosure.

In Embodiment 10, the first receiver 1001 receives a first signaling; the second receiver 1002 receives a first radio signal in K1 slots; and the third receiver 1003 receives a second radio signal in K2 slots; herein, the first signaling is used to determine the K1 and the K2; a first transport block (TB) is used to generate the first radio signal, while a second TB is used to generate the second radio signal, the first TB comprising a positive integer number of bit(s), and the second TB comprising a positive integer number of bit(s); the K1 slots are divided into X1 slot groups, while the K2 slots are divided into X2 slot groups, and the X1 slot groups and the X2 slot groups are interleaved in time domain; X1 is a positive integer greater than 1, and X2 is a positive integer greater than 1, the K1 is a positive integer no less than the X1, and the K2 is a positive integer no less than the X2, and the first signaling is transmitted via an air interface.

In one embodiment, a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2.

In one embodiment, a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2; a number of slots comprised by the first slot set is a smaller value between Q1 and a target threshold, and a number of slots comprised by the second slot set is equal to a smaller value between Q2 and the target threshold, the target threshold being a positive integer, the Q1 being a quotient of the K1 and the M1, and the Q2 being a quotient of the K2 and the M2, the Q1 is a positive integer and the Q2 is a positive integer.

In one embodiment, the first receiver 1001 receives a second signaling; herein, the second signaling is used to determine the X1 and the X2, the second signaling being transmitted via the air interface.

In one embodiment, an output by the first TB through channel coding is used to generate a first modulation symbol sequence, while an output by the second TB through channel coding is used to generate a second modulation symbol sequence, a first bit sequence is used to determine phases of modulation symbols in the first modulation symbol sequence, while a second bit sequence is used to determine phases of modulation symbols in the second modulation symbol sequence, an identifier of the first TB is used to determine an initial value for a generator of the first bit sequence, while an identifier of the second TB is used to determine an initial value for a generator of the second bit sequence.

Embodiment 11

Figure 11:
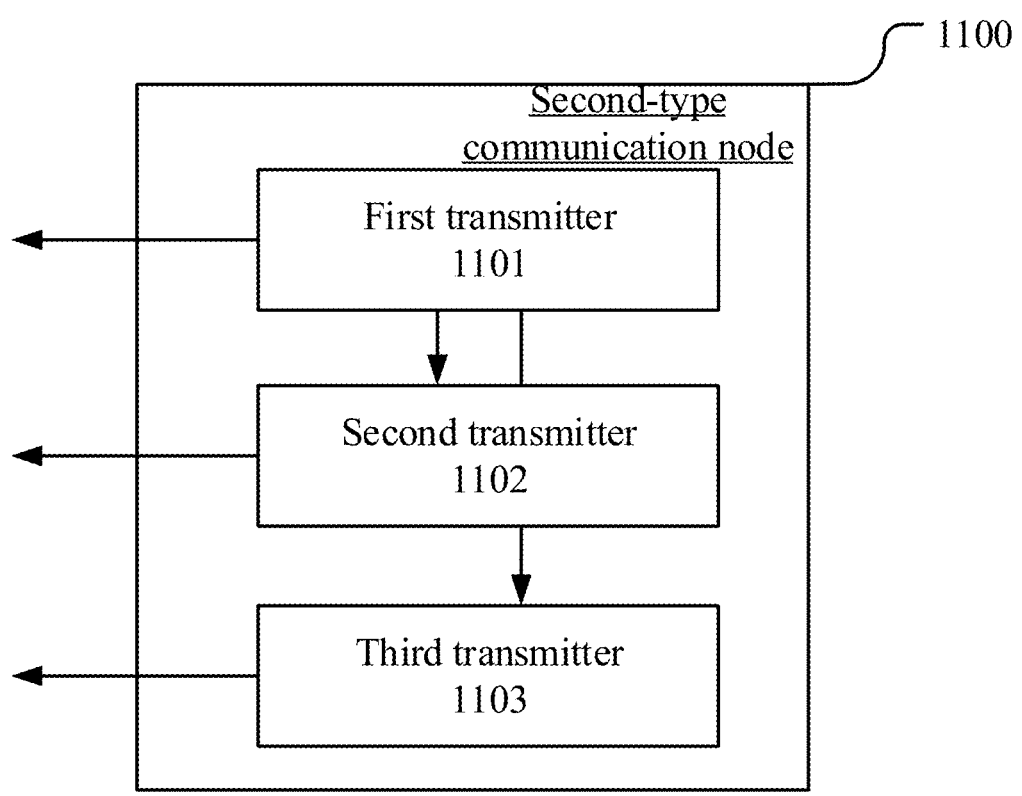
FIG. 11 illustrates a structure block diagram of a processing device in a second-type communication node according to one embodiment of the present disclosure.

Embodiment 11 illustrates a structure block diagram of a processing device in a second-type communication node, as shown in FIG. 11. In FIG. 11, a second-type communication node's processing device 1100 is mainly composed of a first transmitter 1101, a second transmitter 1102 and a third transmitter 1103.

In Embodiment 11, the first transmitter 1101 transmits a first signaling; the second transmitter 1102 transmits a first radio signal in K1 slots; and the third transmitter 1103 transmits a second radio signal in K2 slots; the first signaling is used to determine the K1 and the K2; a first transport block (TB) is used to generate the first radio signal, while a second TB is used to generate the second radio signal, the first TB comprising a positive integer number of bit(s), and the second TB comprising a positive integer number of bit(s); the K1 slots are divided into X1 slot groups, while the K2 slots are divided into X2 slot groups, and the X1 slot groups and the X2 slot groups are interleaved in time domain; X1 is a positive integer greater than 1, and X2 is a positive integer greater than 1, the K1 is a positive integer no less than the X1, and the K2 is a positive integer no less than the X2, and the first signaling is transmitted via an air interface.

In one embodiment, a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2.

In one embodiment, a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2; a number of slots comprised by the first slot set is a smaller value between Q1 and a target threshold, and a number of slots comprised by the second slot set is equal to a smaller value between Q2 and the target threshold, the target threshold being a positive integer, the Q1 being a quotient of the K1 and the M1, and the Q2 being a quotient of the K2 and the M2, the Q1 is a positive integer and the Q2 is a positive integer.

In one embodiment, the first transmitter transmits a second signaling; herein, the second signaling is used to determine the X1 and the X2, the second signaling being transmitted via the air interface.

In one embodiment, an output by the first TB through channel coding is used to generate a first modulation symbol sequence, while an output by the second TB through channel coding is used to generate a second modulation symbol sequence, a first bit sequence is used to determine phases of modulation symbols in the first modulation symbol sequence, while a second bit sequence is used to determine phases of modulation symbols in the second modulation symbol sequence, an identifier of the first TB is used to determine an initial value for a generator of the first bit sequence, while an identifier of the second TB is used to determine an initial value for a generator of the second bit sequence.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first-type communication node or UE or terminal in the present disclosure includes but is not limited to mobile phones, tablet computers, notebooks, network cards, low-consumption equipment, enhanced MTC (eMTC) equipment, NB-IOT terminals, vehicle-mounted equipment, etc. The second-type communication node or base station or network side equipment in the present disclosure includes but is not limited to macro-cellular base stations, micro-cellular base stations, home base stations, relay base station, eNB, gNB, Transmitter Receiver Point (TRP) and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first-type communication node for wireless communications, comprising:
   receiving a first signaling;
   receiving a first radio signal in K1 slots; and
   receiving a second radio signal in K2 slots;
   wherein the first signaling is used to determine K1 and K2; a first transport block (TB) is used to generate the first radio signal, while a second TB is used to generate the second radio signal, the first TB comprising a positive integer number of bit(s), and the second TB comprising a positive integer number of bit(s); the K1 slots are divided into X1 slot groups, while the K2 slots are divided into X2 slot groups, and the X1 slot groups and the X2 slot groups are interleaved in time domain; X1 is a positive integer greater than 1, and X2 is a positive integer greater than 1, the K1 is a positive integer no less than the X1, and the K2 is a positive integer no less than the X2, and the first signaling is transmitted via an air interface; the first signaling comprises all or part of fields in a DCI signaling that schedules the first radio signal and the second radio signal.

2. The method according to claim 1, wherein a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2.

3. The method according to claim 2, wherein a number of slots comprised by the first slot set is a smaller value between Q1 and a target threshold, and a number of slots comprised by the second slot set is equal to a smaller value between Q2 and the target threshold, the target threshold being a positive integer, the Q1 being a quotient of the K1 and the M1, and the Q2 being a quotient of the K2 and the M2, the Q1 is a positive integer and the Q2 is a positive integer.

4. The method according to claim 2, wherein any two slot groups of the X1 slot groups comprise equal numbers of slots, and any two slot groups of the X2 slot groups comprise equal numbers of slots; any of the M1 slot sets comprises consecutive slots that can be used for transmission of the first TB, while any of the M2 slot sets comprises consecutive slots that can be used for transmission of the second TB; the M1 is a positive integer, and the M2 is a positive integer.

5. The method according to claim 1, comprising:
   receiving a second signaling;
   wherein the second signaling is used to determine the X1 and the X2, the second signaling being transmitted via the air interface, and the first signaling and the second signaling are two different fields in a same signaling.

6. The method according to claim 1, wherein an output by the first TB through channel coding is used to generate a first modulation symbol sequence, while an output by the second TB through channel coding is used to generate a second modulation symbol sequence, a first bit sequence is used to determine phases of modulation symbols in the first modulation symbol sequence, while a second bit sequence is used to determine phases of modulation symbols in the second modulation symbol sequence, an identifier of the first TB is used to determine an initial value for a generator of the first bit sequence, while an identifier of the second TB is used to determine an initial value for a generator of the second bit sequence.

7. The method according to claim 1, wherein the first radio signal is transmitted through an NPDSCH, while the second radio signal is transmitted through an NPDSCH; or the first radio signal is transmitted through a PDSCH, while the second radio signal is transmitted through a PDSCH.

8. A first-type communication node for wireless communications, comprising:
   a first receiver, which receives a first signaling;
   a second receiver, which receives a first radio signal in K1 slots; and
   a third receiver, which receives a second radio signal in K2 slots;
   wherein the first signaling is used to determine K1 and K2; a first transport block (TB) is used to generate the first radio signal, while a second TB is used to generate the second radio signal, the first TB comprising a positive integer number of bit(s), and the second TB comprising a positive integer number of bit(s); the K1 slots are divided into X1 slot groups, while the K2 slots are divided into X2 slot groups, and the X1 slot groups and the X2 slot groups are interleaved in time domain; X1 is a positive integer greater than 1, and X2 is a positive integer greater than 1, the K1 is a positive integer no less than the X1, and the K2 is a positive integer no less than the X2, and the first signaling is transmitted via an air interface; the first signaling comprises all or part of fields in a DCI signaling that schedules the first radio signal and the second radio signal.

9. The first-type communication node according to claim 8, wherein a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2.

10. The first-type communication node according to claim 9, wherein a number of slots comprised by the first slot set is a smaller value between Q1 and a target threshold, and a number of slots comprised by the second slot set is equal to a smaller value between Q2 and the target threshold, the target threshold being a positive integer, the Q1 being a quotient of the K1 and the M1, and the Q2 being a quotient of the K2 and the M2, the Q1 is a positive integer and the Q2 is a positive integer.

11. The first-type communication node according to claim 9, wherein any two slot groups of the X1 slot groups comprise equal numbers of slots, and any two slot groups of the X2 slot groups comprise equal numbers of slots; any of the M1 slot sets comprises consecutive slots that can be used for transmission of the first TB, while any of the M2 slot sets comprises consecutive slots that can be used for transmission of the second TB; the M1 is a positive integer, and the M2 is a positive integer.

12. The first-type communication node according to claim 8, wherein the first receiver receives a second signaling; wherein the second signaling is used to determine the X1 and the X2, the second signaling being transmitted via the air interface, and the first signaling and the second signaling are two different fields in a same signaling.

13. The first-type communication node according to claim 8, wherein an output by the first TB through channel coding is used to generate a first modulation symbol sequence, while an output by the second TB through channel coding is used to generate a second modulation symbol sequence, a first bit sequence is used to determine phases of modulation symbols in the first modulation symbol sequence, while a second bit sequence is used to determine phases of modulation symbols in the second modulation symbol sequence, an identifier of the first TB is used to determine an initial value for a generator of the first bit sequence, while an identifier of the second TB is used to determine an initial value for a generator of the second bit sequence.

14. The first-type communication node according to claim 8, wherein the first radio signal is transmitted through an NPDSCH, while the second radio signal is transmitted through an NPDSCH; or the first radio signal is transmitted through a PDSCH, while the second radio signal is transmitted through a PDSCH.

15. A second-type communication node for wireless communications, comprising:
a first transmitter, which transmits a first signaling;
a second transmitter, which transmits a first radio signal in K1 slots; and
a third transmitter, which transmits a second radio signal in K2 slots;
wherein the first signaling is used to determine K1 and K2; a first transport block (TB) is used to generate the first radio signal, while a second TB is used to generate the second radio signal, the first TB comprising a positive integer number of bit(s), and the second TB comprising a positive integer number of bit(s); the K1 slots are divided into X1 slot groups, while the K2 slots are divided into X2 slot groups, and the X1 slot groups and the X2 slot groups are interleaved in time domain; X1 is a positive integer greater than 1, and X2 is a positive integer greater than 1, the K1 is a positive integer no less than the X1, and the K2 is a positive integer no less than the X2, and the first signaling is transmitted via an air interface; the first signaling comprises all or part of fields in a DCI signaling that schedules the first radio signal and the second radio signal.

16. The second-type communication node according to claim 15, wherein a slot group of the X1 slot groups comprises M1 slot set(s), while a slot group of the X2 slot groups comprises M2 slot set(s), a first slot set is one of the M1 slot set(s), and a second slot set is one of the M2 slot set(s); an output by the first TB through channel coding generates a first bit block, while an output by the second TB through channel coding generates a second bit block; each slot in the first slot set carries (a) same bit(s) in the first bit block, while each slot in the second slot set carries (a) same bit(s) in the second bit block; the first signaling is used to determine the M1 and the M2.

17. The second-type communication node according to claim 16, wherein a number of slots comprised by the first slot set is a smaller value between Q1 and a target threshold, and a number of slots comprised by the second slot set is equal to a smaller value between Q2 and the target threshold, the target threshold being a positive integer, the Q1 being a quotient of the K1 and the M1, and the Q2 being a quotient of the K2 and the M2, the Q1 is a positive integer and the Q2 is a positive integer.

18. The second-type communication node according to claim 16, wherein any two slot groups of the X1 slot groups comprise equal numbers of slots, and any two slot groups of the X2 slot groups comprise equal numbers of slots; any of the M1 slot sets comprises consecutive slots that can be used for transmission of the first TB, while any of the M2 slot sets comprises consecutive slots that can be used for transmission of the second TB; the M1 is a positive integer, and the M2 is a positive integer.

19. The second-type communication node according to claim 15, wherein the first transmitter transmits a second signaling; wherein the second signaling is used to determine the X1 and the X2, the second signaling being transmitted via the air interface, and the first signaling and the second signaling are two different fields in a same signaling.

20. The second-type communication node according to claim 15, wherein the first radio signal is transmitted through an NPDSCH, while the second radio signal is transmitted through an NPDSCH; or the first radio signal is transmitted through a PDSCH, while the second radio signal is transmitted through a PDSCH.

* * * * *